US011380288B2

(12) United States Patent
Kikuta et al.

(10) Patent No.: US 11,380,288 B2
(45) Date of Patent: Jul. 5, 2022

(54) IMAGE DISPLAY DEVICE

(71) Applicant: Mitsubishi Electric Corporation, Tokyo (JP)

(72) Inventors: Hayato Kikuta, Tokyo (JP); Hideki Yoshii, Tokyo (JP); Yoshitomo Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 122 days.

(21) Appl. No.: 17/052,218

(22) PCT Filed: Jun. 22, 2018

(86) PCT No.: PCT/JP2018/023746
§ 371 (c)(1),
(2) Date: Nov. 2, 2020

(87) PCT Pub. No.: WO2019/244326
PCT Pub. Date: Dec. 26, 2019

(65) Prior Publication Data
US 2022/0013088 A1  Jan. 13, 2022

(51) Int. Cl.
G09G 5/373 (2006.01)
B60K 35/00 (2006.01)
G02B 27/14 (2006.01)

(52) U.S. Cl.
CPC .............. G09G 5/373 (2013.01); B60K 35/00 (2013.01); G02B 27/144 (2013.01);
(Continued)

(58) Field of Classification Search
None
See application file for complete search history.

(56) References Cited

U.S. PATENT DOCUMENTS 6,023,373 A * 2/2000 Inoguchi ............ G02B 27/0172
349/11
2005/0024722 A1* 2/2005 Agostinelli ............ G03B 21/56
359/451
(Continued)

FOREIGN PATENT DOCUMENTS

JP  10-43382 A  2/1998
JP  2006-177920 A  7/2006
(Continued)

OTHER PUBLICATIONS

International Search Report and Written Opinion dated Sep. 18, 2018 for PCT/JP2018/023746 filed on Jun. 22, 2018, 8 pages including English Translation of the International Search Report.

Primary Examiner — David H Chu
(74) Attorney, Agent, or Firm — Xsensus LLP

(57) ABSTRACT

An image display device includes a panel in a curved surface shape that lets through and reflects light, a first display unit that displays a first image based on first image data that reaches a predetermined position through the panel, a second display unit that displays a second image based on second image data that is reflected by the panel and reaches the predetermined position, a position information acquisition unit that acquires position information indicating a position of an actual viewpoint of an observer, and an image processing unit that determines a scaling factor of the second image data for each scan line based on the position information and performs a scaling process for each scan line on the second image data to be inputted to the second display unit.

11 Claims, 12 Drawing Sheets

(52) U.S. Cl.
CPC .... *B60K 2370/152* (2019.05); *G09G 2300/02* (2013.01); *G09G 2354/00* (2013.01); *G09G 2380/10* (2013.01)

(56) References Cited

U.S. PATENT DOCUMENTS

2006/0227416 A1\* 10/2006 Balu ..................... G03B 21/10
                                                           359/451
2008/0191963 A1    8/2008 Ootaki et al.
2020/0049988 A1\*  2/2020 Kojima ................. G03B 21/28

FOREIGN PATENT DOCUMENTS

JP      2012-242586 A    12/2012
JP      2015-180422 A    10/2015

\* cited by examiner

IMAGE IN OBSERVER 80

DIRECTION OF SCAN LINES →

DIRECTION OF SCAN LINES →

IMAGE DISPLAY DEVICE

CROSS-REFERENCE TO RELATED APPLICATION

The present application is based on PCT filing PCT/JP2018/023746, filed Jun. 22, 2018, the entire contents of which are incorporated herein by reference.

TECHNICAL FIELD

The present invention relates to an image display device.

BACKGROUND ART

Conventionally, there has been known an image display device including a first display unit that displays a first image that reaches an observer's eyes through a half mirror as a light transmissive reflective panel and a second display unit that displays a second image that is reflected by the half mirror and reaches the observer's eyes. The observer recognizes a real image that is the first image, while also recognizing a virtual image based on the second image in three-dimensional space. When the real image and the virtual image intersect with each other, the observer feels a stereognostic sense, that is, a sense of depth, in the viewed image as an effect of the intersecting image display (see Patent Reference 1, for example).

Further, by forming the half mirror in a concave surface shape as viewed from the observer, the virtual image is recognized in a magnified state due to a lens effect of the concave surface, and thus the size of the second display unit can be reduced. Furthermore, forming the half mirror in the concave surface shape makes it possible to inhibit reflected light of external light such as environmental light from reaching the observer's eyes.

PRIOR ART REFERENCE

Patent Reference

Patent Reference 1: Japanese Patent Application Publication No. 2006-177920

SUMMARY OF THE INVENTION

Problem to be Solved by the Invention

However, in cases where the half mirror is formed in the concave surface shape, the intersection position of the real image and the virtual image and the inclination of the virtual image with respect to the real image change corresponding to a change in the position of the observer's eyes, that is, a change in the position of the viewpoint, and thus there are cases where the observer cannot appropriately feel the stereognostic sense as the effect of the intersecting image display.

An object of the present invention, which has been made to resolve the above-described problem with the conventional technology, is to provide an image display device that lets the observer appropriately feel the stereognostic sense even when the position of the observer's viewpoint changes.

Means for Solving the Problem

An image display device according to an aspect of the present invention includes a panel in a curved surface shape that lets through and reflects incident light, a first display unit that displays a first image based on first image data that reaches a predetermined position through the panel, a second display unit that displays a second image based on second image data that is reflected by the panel and reaches the predetermined position, a position information acquisition unit that acquires position information indicating a position of an actual viewpoint of an observer observing the first image and the second image, and an image processing unit that determines a scaling factor of the second image data for each scan line based on the position information and performs a scaling process for each scan line on the second image data to be inputted to the second display unit by using the scaling factor.

Effect of the Invention

According to the present invention, the observer can appropriately feel the stereognostic sense even when the position of the observer's viewpoint changes.

MODE FOR CARRYING OUT THE INVENTION

An image display device according to each embodiment of the present invention will be described below with reference to the accompanying drawings. In the following embodiments, descriptions will be given of examples in which the image display device is mounted on the instrument panel of a vehicle (e.g., automobile). However, the image display device according to each embodiment is usable also for purposes other than vehicles. The following embodiments are just examples and a variety of modifications are possible within the scope of the present invention.

In each drawing, coordinate axes of an xyz orthogonal coordinate system are shown as needed. In each drawing, the z-axis is a coordinate axis substantially parallel to an observer's line of sight. A +z-axis direction is a direction heading from the observer's viewpoint towards the image display device. The x-axis is a coordinate axis orthogonal to the z-axis and in a substantially horizontal direction. An x-axis direction corresponds to a direction of horizontal scan lines of a first image and a second image. The y-axis is a coordinate axis orthogonal to the z-axis and the x-axis and in a substantially vertical direction. A +y-axis direction is a vertically upward direction.

(1) First Embodiment (1-1) Configuration

Figure 1:
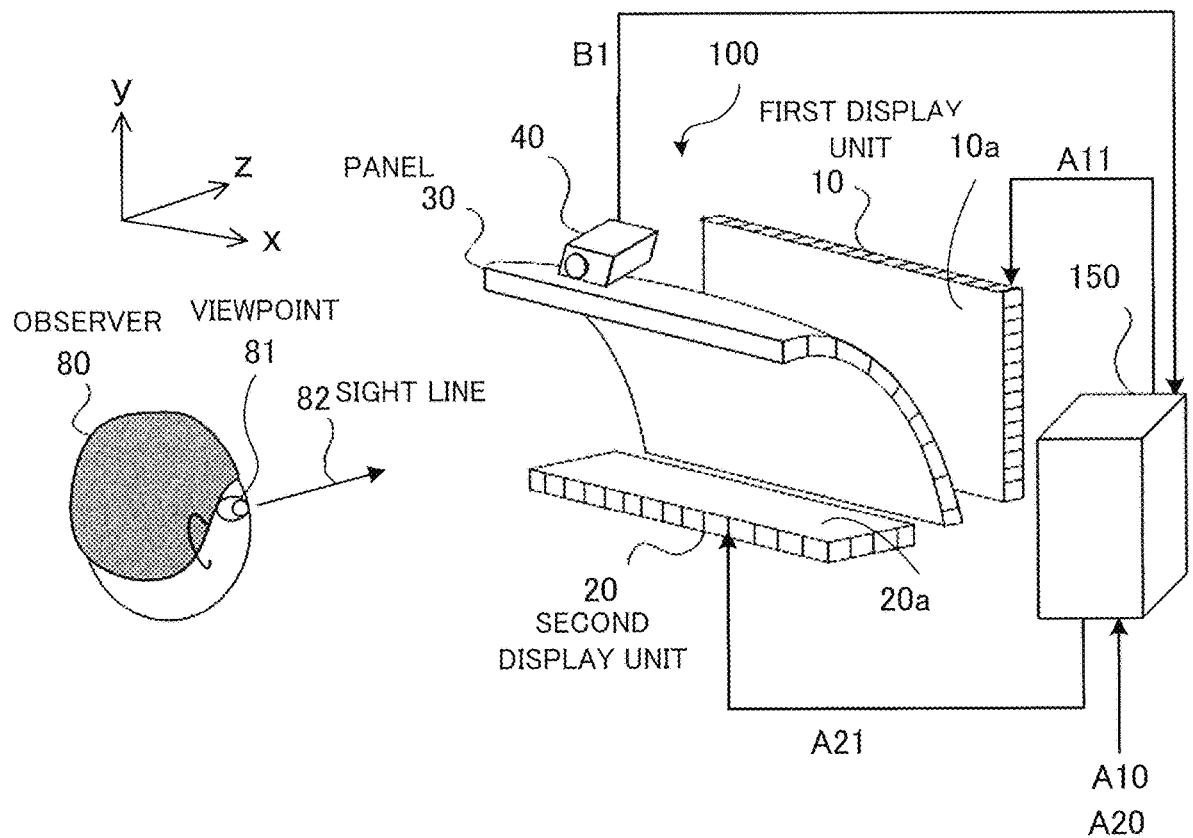
FIG. 1 is a diagram schematically showing the configuration of an image display device according to a first embodiment of the present invention.

FIG. 1 is a diagram schematically showing the configuration of an image display device 100 according to a first embodiment of the present invention. FIG. 1 shows the structure of an optical system of the image display device 100 as viewed from obliquely above, an observer 80 viewing an image in a direction of a sight line 82, and an image processing unit 150. As shown in FIG. 1, the image display device 100 according to the first embodiment includes a first display unit 10 having a display region 10a for displaying the first image, a second display unit 20 having a display region 20a for displaying the second image, a panel 30 that is a light transmissive reflective panel, a position information acquisition unit 40 that acquires position information on a viewpoint 81 as the position of the eyes of the observer 80, and the image processing unit 150 that provides the first display unit 10 and the second display unit 20 respectively with first image data A11 and second image data A21.

Figure 2:
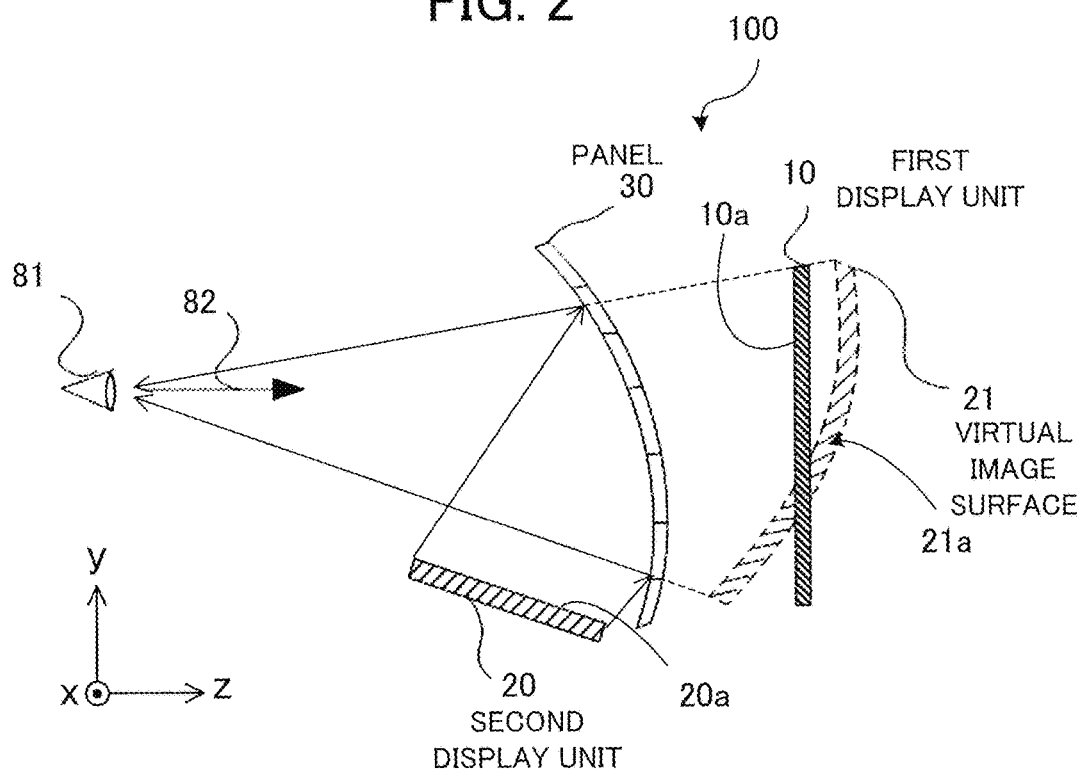
FIG. 2 is a vertical sectional view schematically showing the structure of an optical system of the image display device according to the first embodiment and a virtual image surface.

FIG. 2 is a vertical sectional view schematically showing the structure of the image display device 100 shown in FIG. 1 and a virtual image surface 21. FIG. 2 shows a vertical sectional structure of the image display device 100 shown in FIG. 1 sliced by a plane parallel to a yz plane. FIG. 2 illustrates a situation in which the second image displayed on the display region 20a of the second display unit 20 is projected as image light onto the panel 30 and the projected image light is reflected by the panel 30 and heads towards the viewpoint 81 of the observer 80.

The panel 30 is a plate-like optical element in a curved surface shape that lets allow incident light to pass through and reflects the incident light. In other words, the panel 30 is an optical element having a property of splitting the incident light into transmitted light and reflected light. The panel 30 is a half mirror, for example. The half mirror is an optical element that splits the incident light into transmitted light and reflected light substantially equal to each other in the intensity. However, the transmitted light intensity and the reflected light intensity of the half mirror may differ from each other. The panel 30 may be formed with a light transmissive material causing the transmitted light intensity to be higher than the reflected light intensity, such as a glass plate or an acrylic plate. In cases where the first display unit 10 and the second display unit 20 are devices emitting linearly polarized light as the image light like a liquid crystal display, the panel 30 can be an optical element provided with reflective polarizing film that lets through only a light component having a particular polarization direction. In this case, it is possible to let the image light emitted from the first display unit 10 reach the observer 80 with high efficiency through the panel 30 and let the image light emitted from the second display unit 20 be reflected by the panel 30 and reach the observer 80 with high efficiency.

In the example of FIG. 1, the panel 30 is in a concave surface shape as viewed from the viewpoint 81 of the observer 80. In the example of FIG. 1, a cross section of the panel 30 slicing the panel 30 at a substantially horizontal plane including the sight line 82 heading from the viewpoint 81 towards the panel 30, that is, a plane substantially parallel to an xz plane, is in a straight shape. Further, a cross section of the panel 30 slicing the panel 30 at a substantially vertical plane including the sight line 82, that is, a plane parallel to a yz plane, is in an arc-like shape. In the example of FIG. 1, the panel 30 is in a curved surface shape having a gentle inclination at an angle close to a horizontal plane (i.e., xz plane) in a part close to the upper end and a steep inclination at an angle close to a vertical plane (i.e., xy plane) in a part close to the lower end.

The image display device 100 according to the first embodiment is a device mounted on the instrument panel of a vehicle, for example. In this case, the observer 80 is the driver of the vehicle. Thus, there are cases where the observer 80 views the image displayed by the image display device 100 in an environment with the existence of external light emitted from the sun, an illuminating light source of another vehicle, or the like at a position above the image display device 100, that is, in the +y-axis direction relative to the upper end of the first display unit 10 and at a position behind the first display unit 10, that is, in the +z-axis direction relative to the first display unit 10. Configuring the panel 30 so that the part close to the upper end of the panel 30 has a gentle inclination close to the horizontal plane makes it possible to point the external light reflected by the panel 30 towards a position below the position of the eyes of the observer 80. Accordingly, the visually annoying external light hardly enters the eyes of the observer 80.

The first display unit 10 is arranged at a position behind the panel 30 as viewed from the observer 80, that is, in the +z-axis direction relative to the panel 30. The first display unit 10 is desired to be arranged so that the display region 10a is substantially vertical to the sight line 82 of the observer 80, that is, substantially parallel to the xy plane.

The first display unit 10 displays the first image based on the first image data A11 supplied from the image processing unit 150 on the display region 10a. The first image data A11 is, for example, image data obtained by performing a scaling process on inputted image data A10. The scaling process includes a magnification process and a reduction process. The scaling process can include a scaling process in a vertical scan direction and a scaling process in a horizontal scan direction. The scaling process does not need to be a scaling process for each scan line that is performed by determining the scaling factor for each scan line. The scaling factor includes a magnification ratio and a reduction ratio. However, the scaling process can also be a scaling process for each scan line. The first image displayed on the display region 10a of the first display unit 10 reaches a predetermined position through the panel 30. The predetermined position is, for example, a position in a range where the viewpoint 81 of the observer 80 is supposed to have the possibility to exist. The observer 80 views the first image displayed on the display region 10a of the first display unit 10 through the panel 30.

The second display unit 20 displays the second image based on the second image data A21 supplied from the image processing unit 150 on the display region 20a. The second image data A21 is image data obtained by performing a scaling process for each scan line on inputted image data A20. In the example of FIG. 1, the second image data A21 is image data obtained by performing a scaling process for each horizontal scan line on the inputted image data A20. However, the second image data A21 may also be image data obtained by performing both the scaling process for each horizontal scan line and a scaling process in the vertical scan direction on the inputted image data A20.

The second image based on the second image data A21 is projected onto the panel 30, reflected by the panel 30, and reaches a predetermined position. The predetermined position is, for example, a position in the range where the viewpoint 81 is supposed to have the possibility to exist, which is the same position as the position in the range where the first image is supposed to reach. The observer 80 views the second image displayed on the display region 20a of the second display unit 20 as a virtual image 21a existing on the virtual image surface 21 at a position farther than the panel 30. The second display unit 20 is situated below the panel 30 (situated at a position in the −y-axis direction relative to the panel 30) and is arranged with its display region 20a pointed upward or pointed obliquely upward to face the panel 30 so that the image light based on the second image displayed on the display region 20a of the second display unit 20 is reflected by the panel 30 and heads towards the observer 80.

The first display unit 10 is a display device that displays the first image on the display region 10a and thereby emits image light from the display region 10a. The second display unit 20 is a display device that displays the second image on the display region 20a and thereby emits image light from the display region 20a. Each of the first display unit 10 and the second display unit 20 is, for example, a liquid crystal display including a transmissive liquid crystal panel and a Light-Emitting Diode (LED) backlight. Each of the first display unit 10 and the second display unit 20 may also be a display device of the self-luminous type, such as a plasma emission display, an organic ElectroLuminescence (EL) display, or an LED display having a plurality of LEDs arranged in the vertical scan direction and the horizontal scan direction. Further, the first display unit 10 may also be a projective display device made up of a screen that is set at the position where the first display unit 10 is shown in FIG. 1 and FIG. 2 and a projector that projects an image onto the screen by means of projection light. In this case, the projection light emitted from the projector undergoes irregular reflection on the screen and that allows the first image heading from the screen towards the observer 80 to reach the observer 80.

Further, the image light emitted from the display region 20a of the second display unit 20 is reflected by the panel 30 and heads towards the observer 80. Therefore, luminance of the virtual image 21a recognized by the observer 80 to exist on the virtual image surface 21 can be increased by providing the liquid crystal display constituting the second display unit 20 with a prism sheet for controlling light distribution properties. The prism sheet is an optical member having a prism surface on which a plurality of minute unit prisms are arrayed.

The virtual image surface 21 is a virtual surface on which the observer 80 recognizes the virtual image 21a to exist due to the image light emitted from the second display unit 20, reflected by the panel 30 and reaching the eyes of the observer 80. In the first embodiment, the panel 30 is in the curved surface shape, and thus the virtual image 21a on the virtual image surface 21 recognized by the observer 80 is stretched in the vertical direction, that is, magnified in the vertical direction, as viewed from the observer 80. Since this virtual image 21a is formed by use of a reflecting surface of the panel 30, diffused light emitted from each pixel forming the display region 20a of the second display unit 20 does not converge on one point. Namely, the diffused light emitted from each pixel forming the display region 20a of the second display unit 20 is stretched in the vertical direction, that is, magnified in the vertical direction. Further, since the panel 30 is in the curved surface shape, the magnification ratio of the stretched diffused light varies depending on the position of the viewpoint 81 of the observer 80, and the appearance of the virtual image 21a on the virtual image surface 21 changes with a change in the position of the viewpoint 81.

The position information acquisition unit 40 acquires position information indicating the position of the actual viewpoint 81 of the observer 80 observing the image. The position information acquisition unit 40 can include, for example, a camera as an image capturing device that photographs the face of the observer 80 and an analysis unit that detects the positions of the eyes based on face image data obtained by the camera photographing. Put another way, the position information acquisition unit 40 can include a sensor device that detects position information on the viewpoint 81 of the observer 80 and an analysis unit that acquires the position information based on the output from the sensor device. While this analysis unit may be provided in the position information acquisition unit 40, the analysis unit may also be provided in the image processing unit 150. The image processing unit 150 can be a computer. The position information acquisition unit 40 is not particularly limited as long as it is a means capable of acquiring position information indicating the position of the actual viewpoint 81 of the observer 80. For example, the position information acquisition unit 40 can be a device that detects the position of the viewpoint 81 by applying infrared rays to the observer 80 and sensing and analyzing reflected light from the observer 80.

The image processing unit 150 determines the scaling factor of the second image data for each scan line based on the position information indicating the position of the actual viewpoint 81 of the observer 80, performs the scaling process for each scan line on the image data A20 to be inputted to the second display unit 20 by using the scaling factor, and outputs the second image data A21 after undergoing the scaling process for each scan line. The image processing unit 150 may also output the first image data A11 by determining the scaling factor of the image data A10 based on the position information B1 indicating the position of the actual viewpoint 81 of the observer 80 and performing the scaling process on the image data A10 according to the determined scaling factor by use of the scaling factor. Since the first display unit 10 has a flat surface, the scaling process for calculating the first image data A11 does not need to be a scaling process for each scan line. However, the scaling process for calculating the first image data A11 may also be performed as a scaling process for each scan line similarly to the process for calculating the second image data S12 A21.

The image processing unit 150 in FIG. 1 changes the second image data A21 to be inputted to the second display unit 20 according to the position information B1 on the viewpoint 81 obtained from the position information acquisition unit 40. The image processing unit 150 generates the second image data A21 by performing the scaling process for each scan line on the inputted image data A10 so that the observer 80 recognizes that the position and the inclination of the virtual image surface 21 in the three-dimensional space do not change even when the position of the viewpoint 81 changes.

Figure 3:
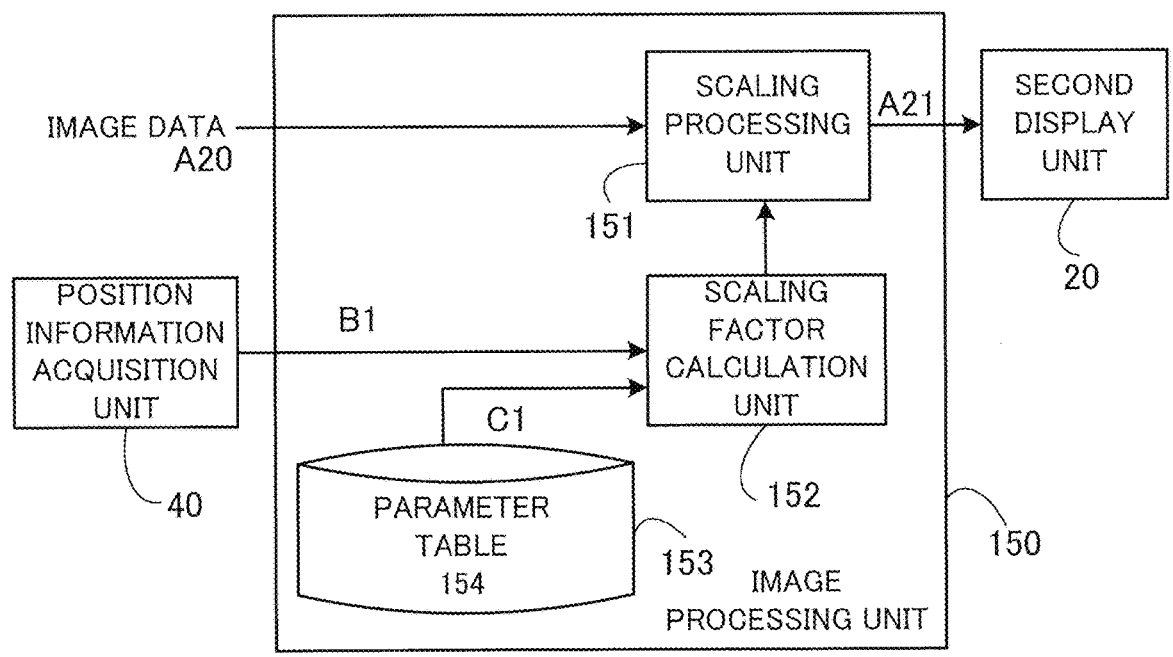
FIG. 3 is a block diagram showing components of a principal part of an image processing unit of the image display device according to the first embodiment.

FIG. 3 is a block diagram showing components of a principal part of the image processing unit 150 of the image display device 100 according to the first embodiment. As shown in FIG. 3, the image processing unit 150 includes a scaling processing unit 151 capable of performing the scaling process, i.e., a magnifying or reducing process, for each scan line on the inputted image data A20, a scaling factor calculation unit 152 that determines the scaling factor, i.e., the magnification ratio or the reduction ratio, used for the scaling process, and a storage unit 153 that stores reference information to be used for the determination of the scaling factor as a parameter table 154. The image processing unit 150 receives the image data A20 representing the second image to be displayed by the second display unit 20 and the position information B1 on the viewpoint 81 obtained from the position information acquisition unit 40 for acquiring the position of the viewpoint 81 of the observer 80, and provides the second display unit 20 with the second image data A21 after undergoing the scaling process for each scan line. The scaling factor calculation unit 152 of the image processing unit 150 calculates the scaling factor for each scan line based on the position information on the viewpoint 81 and information in the parameter table 154 stored in the storage unit 153. In the first embodiment, for each scan line means, for example, for each horizontal scan line including a plurality of pixels. For each scan line can also be used in the meaning of for each vertical scan line including a plurality of pixels, and it is also possible to perform the scaling process for each horizontal scan line and for each vertical scan line. The scaling processing unit 151 receives the scaling factor for each scan line determined by the scaling factor calculation unit 152, performs the scaling process for each scan line on the inputted image data A20, and outputs the second image data A21 after undergoing the scaling process for each scan line.

The parameter table 154 stored in the storage unit 153 is, for example, a data table storing constants that will be necessary in a calculation formula used by the scaling factor calculation unit 152. The data stored as the parameter table 154 includes, for example, projection position information about a projection image (i.e., the second image displayed on the display region 20a of the second display unit 20), which lets the observer 80 recognize the virtual image on the virtual image surface 21 at a desired position in the three-dimensional space, in regard to each position of the viewpoint 81 of the observer 80. This projection position information can include, for example, three-dimensional plane information represented by a linear function in the three-dimensional space and a boundary condition used for cutting out a plane represented by the three-dimensional plane information. The projection position information can also be a data set including three-dimensional position information on each unit pixel of an intended image on a projection plane, for example. Each unit pixel is a group of pixels included in each region when the image is divided into regions arrayed in predetermined plural numbers of rows and columns.

Further, the parameter table 154 may hold three-dimensional position information on the panel 30. The three-dimensional position information on the panel 30 may include, for example, a function representing a three-dimensional curved surface, such as an exponential function or a three-dimensional function representing the curved surface of the panel 30, and coordinates of the panel 30. Furthermore, the parameter table 154 may include, for example, coordinate information representing a plurality of polygons used for making approximation of the curved surface of the panel 30 by using a combination of a plurality of polygons each connecting three unit coordinate points represented by the coordinate axes of the three-dimensional space.

(1-2) Operation

Figure 4:
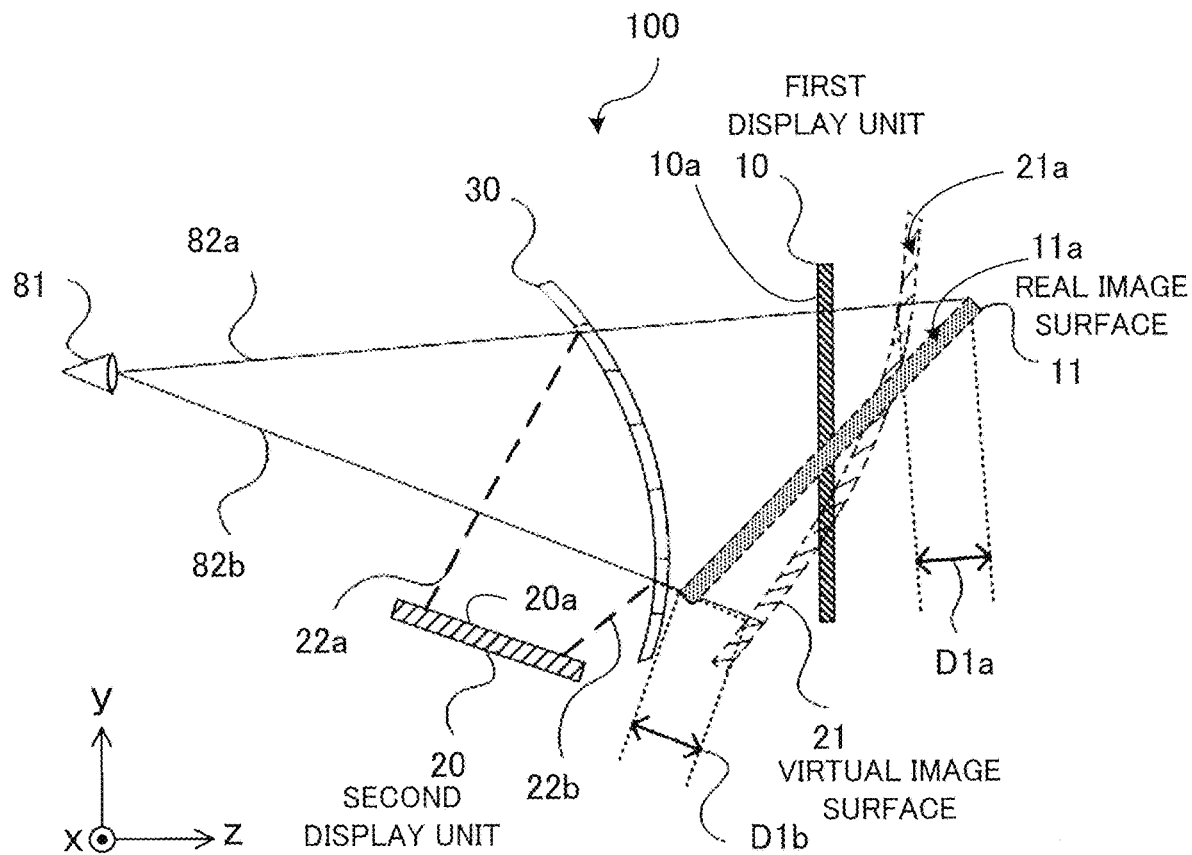
FIG. 4 is a vertical sectional view schematically showing the structure of the optical system of the image display device according to the first embodiment, the virtual image surface, and a real image surface.

FIG. 4 is a vertical sectional view schematically showing the structure of the optical system of the image display device 100 according to the first embodiment, the virtual image surface 21, and a real image surface 11. As shown in FIG. 4, in the first embodiment, the observer 80 viewing the first image displayed on the display region 10a of the first display unit 10 (e.g., an image using the law of perspective shown in FIG. 11 which will be explained later) can recognize the first image displayed on the display region 10a of the first display unit 10 as a real image 11a existing on the real image surface 11 that is inclined with respect to the display region 10a. In the first embodiment, the first image displayed on the display region 10a of the first display unit 10 is set so that the real image surface 11 intersects with the display region 10a at an angle of approximately 45 degrees at a position substantially at the center of the display region 10a of the first display unit 10 in the vertical direction as the intersection position. By adjusting the first image displayed on the display region 10a of the first display unit 10, it is possible to arbitrarily set the intersection position of the real image surface 11 and the display region 10a, the intersection angle between the real image surface 11 and the display region 10a, and display size of the real image 11a. In the first embodiment, the virtual image surface 21 exists in front of and behind the real image surface 11 as viewed from the viewpoint 81 of the observer 80, that is, so as to intersect with the real image surface 11. A method for changing the intersection position of the real image surface 11, the intersection angle and the display size will be explained in a second embodiment which will be described later.

A description will be given below of a method of calculating the vertical direction scaling factor of the second image projected by the second display unit 20 in order to display the virtual image 21a on the virtual image surface 21. The image data A20 inputted to the image processing unit 150 is image information having a resolution adapted to the display size on the desired real image surface 11. Here, in regard to each horizontal scan line of the inputted image data A20, a point arranged on the real image surface 11 and the position of the viewpoint 81 of the observer 80 are connected together by a straight line. For example, in FIG. 4, the straight line 82a as a solid line is a straight line connecting the position of the viewpoint 81 of the observer 80 and an upper end horizontal scan line on the real image surface 11. Further, the straight line 82b as a solid line is a straight line connecting the position of the viewpoint 81 of the observer 80 and a lower end horizontal scan line on the real image surface 11. These straight lines 82a and 82b have been set arbitrarily and setting information indicating the contents of the settings is stored in the parameter table 154 of the storage unit 153. The straight lines 82a and 82b can be calculated as liner functions in the three-dimensional space based on position information on the real image surface 11 and the position information on the viewpoint 81 of the observer 80 obtained from the position information acquisition unit 40.

Subsequently, a vertical direction display position of each horizontal scan line on the virtual image surface 21, for letting the virtual image surface 21 be perceivable as viewed from the observer 80 like the real image surface 11, is found by connecting together intersection points of the virtual image surface 21 and the straight lines 82a and 82b connecting the viewpoint 81 of the observer 80 and the real image surface 11. Here, the vertical direction display position of each horizontal scan line to be determined is the position of the second image on the display region 20a of the second display unit 20 projected on the intersection point with the virtual image surface 21, and thus an intersection point of a straight line obtained by inverting the straight line 82a, 82b to a position symmetrical with respect to the surface of the panel 30 (i.e., broken line 22a, 22b) and the display region 20a of the second display unit 20 is calculated. For example, in regard to the upper end horizontal scan line on the real image surface 11 intersecting with the straight line 82a in FIG. 4, the intersection point of the broken line 22a and the display region 20a of the second display unit 20 is the calculated position. Similarly, in regard to the lower end horizontal scan line on the real image surface 11 intersecting with the straight line 82b, the intersection point of the broken line 22b and the display region 20a of the second display unit 20 is the calculated position. These broken lines 22a and 22b can be calculated from the three-dimensional position information on the panel 30 stored in the parameter table 154 and the liner functions representing the straight lines 82a and 82b. The calculated position coordinates of each horizontal scan line on the display region 20a of the second display unit 20 are synonymous with a display position of the second image data A21. Therefore, the scaling factor for the inputted image data A20 in the vertical direction can be obtained by transforming the calculated position coordinates of each horizontal scan line on the display region 20a of the second display unit 20 into two-dimensional coordinates on the display region 20a of the second display unit 20.

A description will be given below of a method of calculating the scaling factor of the horizontal direction of the image projected by the second display unit 20 in order to display the virtual image 21a on the virtual image surface 21. A display region as an object of recognition is recognized by the observer 80 in a more magnified state as the display region is situated closer and in a more reduced state as the display region is situated farther according to the law of direct perspective. Therefore, the scaling factor in the horizontal direction for each horizontal scan line in the first embodiment may be calculated by taking into account the difference between the virtual image surface 21 and the real image surface 11 in the distance as viewed from the observer 80, that is, in the position in the z-axis direction.

Figure 5:
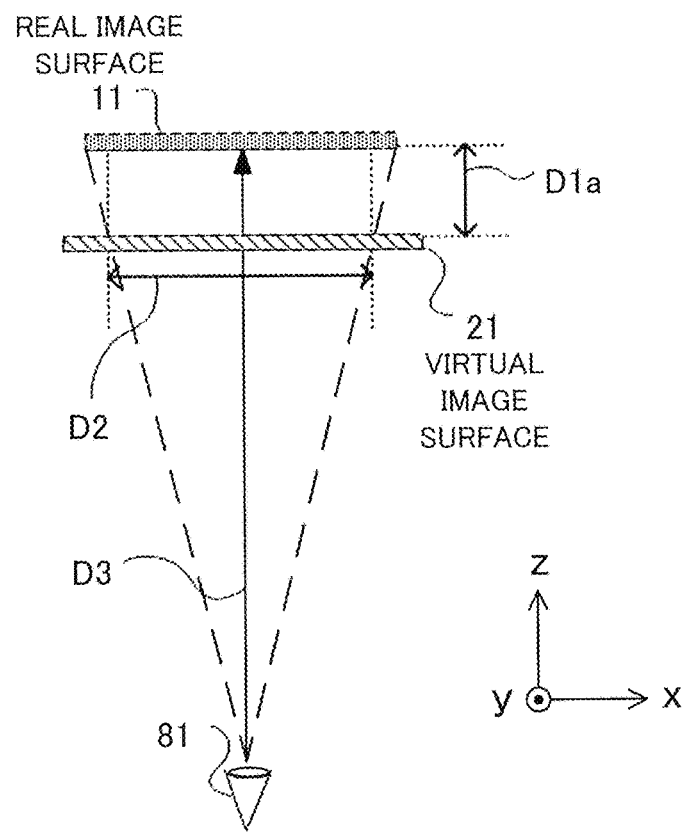
FIG. 5 is a transverse sectional view showing an example of a calculation method of a scaling factor (reduction ratio) for each scan line in the image processing unit of the image display device according to the first embodiment.

FIG. 5 is a transverse sectional view showing an example of a calculation method of the scaling factor (reduction ratio) for each scan line in the image processing unit 150 of the image display device 100 according to the first embodiment. In the example of FIG. 5, the real image surface 11 is situated farther than the virtual image surface 21 as viewed from the viewpoint 81 of the observer 80, and thus it is necessary to reduce the virtual image in the horizontal direction, namely, the x-axis direction. To calculate the reduction ratio of the image reduction, intersection points of the virtual image surface 21 and straight lines connecting the viewpoint 81 of the observer 80 and left and right ends of the real image surface 11 are found and a length D2 between the two intersection points is obtained. The ratio between the length D2 and a horizontal direction size based on the inputted image data A20 is the reduction ratio to be obtained.

Figure 6:
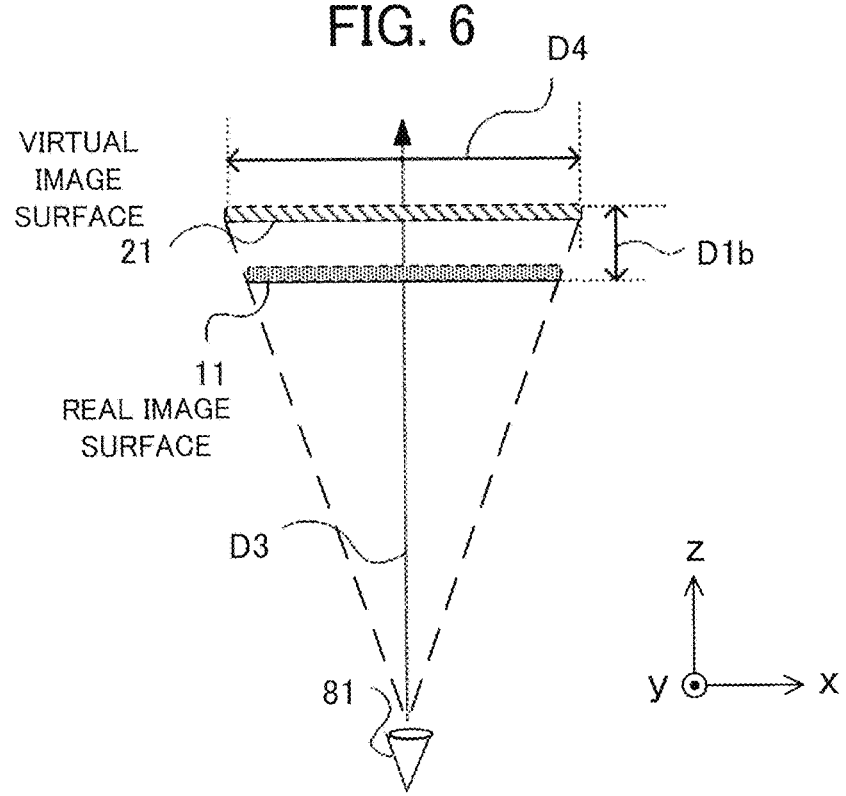
FIG. 6 is a transverse sectional view showing an example of a calculation method of a scaling factor (magnification ratio) for each scan line in the image processing unit of the image display device according to the first embodiment.

FIG. 6 is a transverse sectional view showing an example of a calculation method of the scaling factor (magnification ratio) for each scan line in the image processing unit 150 of the image display device 100 according to the first embodiment. In the example of FIG. 6, the real image surface 11 is situated closer than the virtual image surface 21 as viewed from the viewpoint 81 of the observer 80, and thus it is necessary to magnify the virtual image in the horizontal direction, namely, the x-axis direction. To calculate the magnification ratio of the image magnification, straight lines connecting the viewpoint 81 of the observer 80 and the left and right ends of the real image surface 11 are extended, intersection points of the virtual image surface 21 and the extended straight lines are found, and a length D4 between the two intersection points is obtained. The ratio between the length D4 and the horizontal direction size regarding the inputted image data A20 is the magnification ratio to be obtained.

Incidentally, the size D2 in the horizontal direction shown in FIG. 5 is in a proportional relationship with Dla as the distance between the desired real image surface 11 and the virtual image surface 21. Further, the size D4 in the horizontal direction shown in FIG. 6 is in a proportional relationship with Dlb as the distance between the desired real image surface 11 and the virtual image surface 21. Furthermore, the distance between the real image surface 11 and the virtual image surface 21 can be calculated from the three-dimensional position information obtained in the calculation of the scaling factor in the vertical direction. Therefore, the scaling factor in the horizontal direction can also be calculated from parameter information and the position information on the viewpoint 81, namely, from the distance Dla in the direction of the straight line 82a shown in FIG. 4 and the distance Dlb in the direction of the straight line 82b shown in FIG. 4.

The scaling processing unit 151 in FIG. 3 performs the scaling process on the inputted image data A20 by using the scaling factor in the scan line direction for each scan line obtained by the scaling factor calculation unit 152. For example, in this scaling process, the image data A20 is held in a memory, the image data A20 is transformed into image data after undergoing scaling in the vertical direction according to the scaling factor in the vertical direction, that is, scaling (e.g., reduction) of the interval of the scan lines, and the scaling process for each horizontal scan line is performed by using the scaling factor in the horizontal scan direction for each horizontal scan line. The scaling process may also be performed by, for example, holding data of all pixels of the inputted image data A20 in a storage unit (not shown) and multiplying the data of all pixels by a projective transformation matrix regarding all pixels that can be calculated from the scaling factor information.

Figure 7:
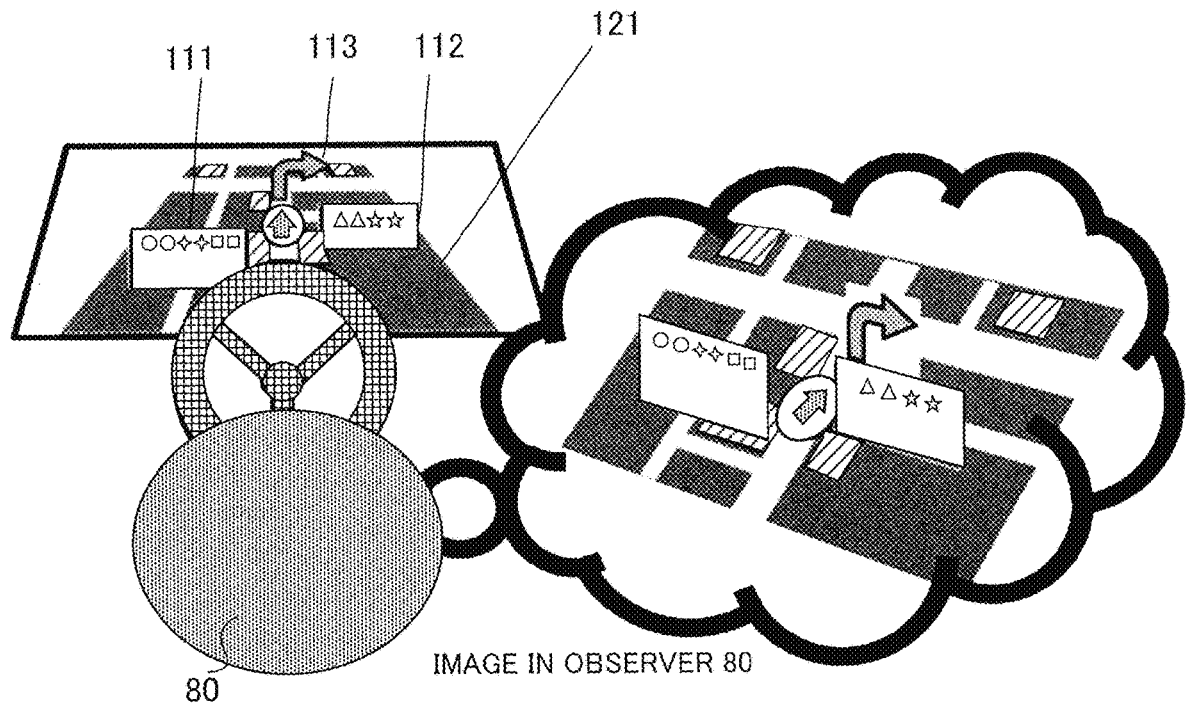
FIG. 7 is a diagram showing an example of a first image and a second image displayed by the image display device according to the first embodiment.

FIG. 7 is a diagram showing an example of the first image and the second image displayed by the image display device 100 according to the first embodiment. FIG. 7 shows a case where the image display device 100 is an in-vehicle display mounted on the instrument panel of a vehicle. The observer 80 is the driver of the vehicle, for example. FIG. 7 illustrates a case where the image display device 100 is arranged in a front and central part of the vehicle. By use of the panel 30 in the curved surface shape according to the first embodiment, the image display device 100 can realize a compact housing size not compressing the space for arranging functions necessary for the vehicle. Further, thanks to the panel 30 in the curved surface shape, external light from the front or side of the vehicle can be inhibited from reflecting towards the driver as the observer 80.

As an example of display content in FIG. 7, the first display unit 10 is displaying present location information 111, distance information 112 regarding the distance to the destination, and an icon 113 indicating a direction as notification information on a map. The virtual image displayed by the second display unit 20 includes a map image 121. Making the real image surface 11 and the virtual image surface 21 intersect with each other enables the observer 80 to intuitively feel the sense of depth on the map and has an advantage of making it unlikely to erroneously recognize the direction indication on the map. Further, making the real image surface 11 and the virtual image surface 21 intersect with each other has an advantage of eliminating difference in the sense of speed between the vehicle and the map display content and making it easy to have an appropriate sense of distance.

Figure 8:
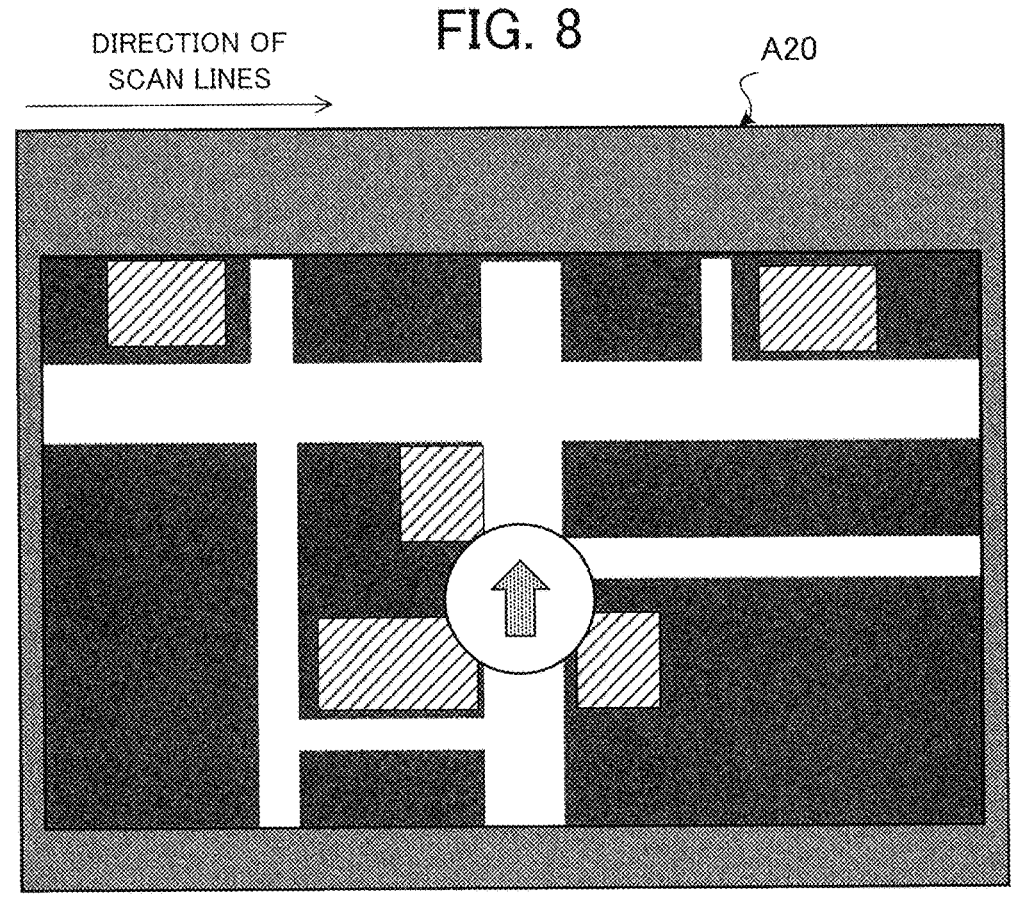
FIG. 8 is a diagram showing an example of the second image without undergoing a scaling process for each scan line (i.e., second image as a comparative example) displayed on a second display unit of the image display device according to the first embodiment.
Figure 9:
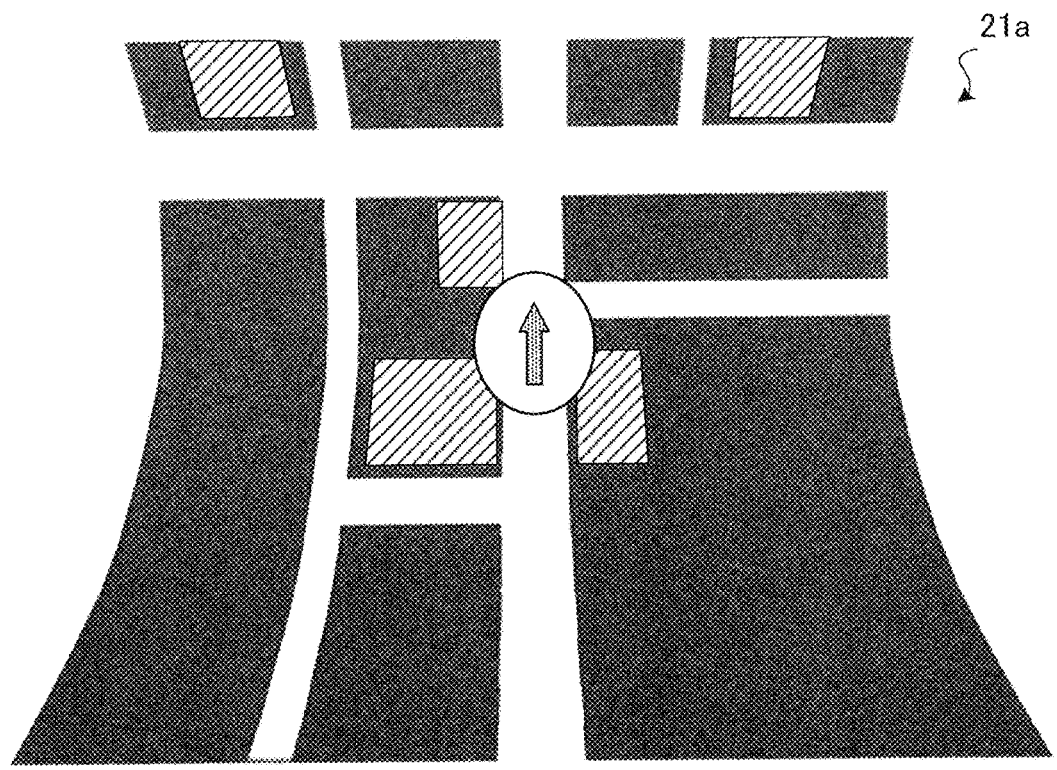
FIG. 9 is a diagram showing a virtual image on the virtual image surface visually recognized by an observer when the second image shown in FIG. 8 (i.e., the second image as the comparative example) is displayed on the second display unit of the image display device according to the first embodiment.

FIG. 8 is a diagram showing an example of the second image without undergoing the scaling process for each scan line (i.e., second image as a comparative example) displayed on the second display unit 20 of the image display device 100 according to the first embodiment. FIG. 9 is a diagram showing the virtual image 21a on the virtual image surface 21 visually recognized by the observer 80 when the second image shown in FIG. 8 (i.e., the second image as the comparative example) is displayed on the second display unit 20 of the image display device 100 according to the first embodiment. For example, when the image data A20 of the map that has not undergone the scaling process for each scan line is inputted to the second display unit 20 as the second image data A21 as shown in FIG. 8, the virtual image 21a of the map as viewed from the position of the viewpoint 81 of the driver as the observer 80 is in an unnaturally distorted shape as shown in FIG. 9. In the example of FIG. 9, an image at a position close to the upper end of the second display unit 20 is displayed in a state of being magnified in the horizontal scan direction. The magnification ratio of the magnification varies depending on the position of the viewpoint 81 of the observer 80. Thus, when the position of the viewpoint 81 changes, for example, the observer 80 visually recognizes a map in a shape different from that of the map shown in FIG. 9 as the virtual image 21a.

Figure 10:
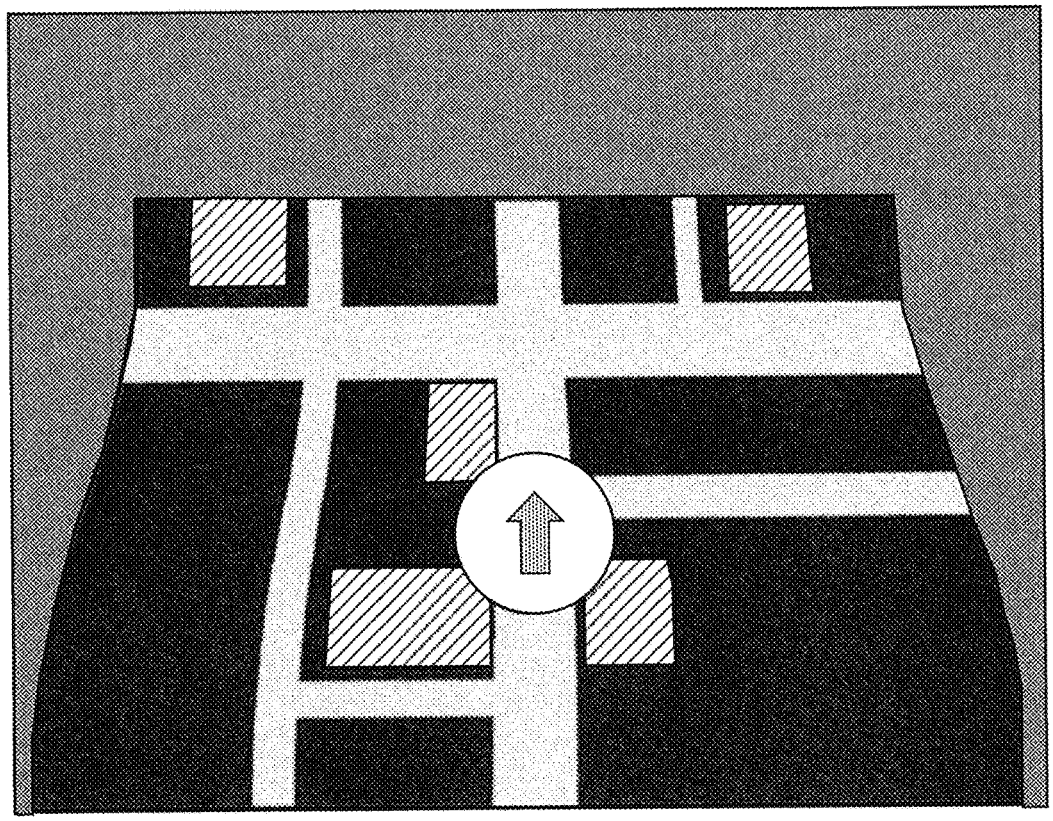
FIG. 10 is a diagram showing an example of the second image after undergoing the scaling process for each scan line (i.e., an example of the second image in the first embodiment) displayed on the second display unit of the image display device according to the first embodiment.
Figure 11:
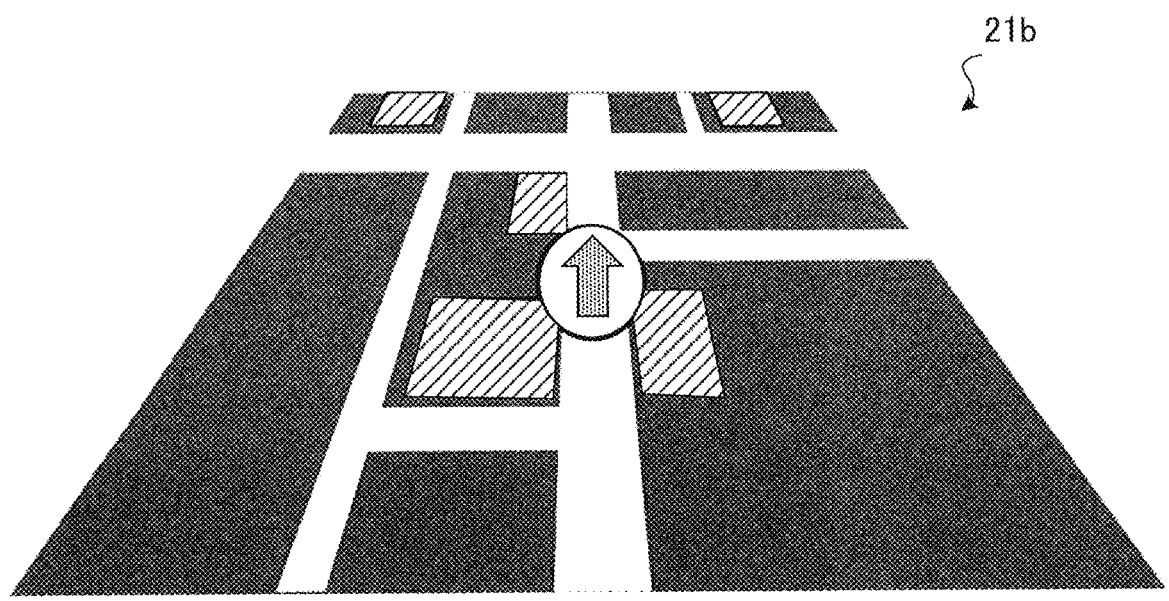
FIG. 11 is a diagram showing the virtual image visually recognized by the observer when the second image shown in FIG. 10 (i.e., the second image in the first embodiment) is displayed on the second display unit of the image display device according to the first embodiment.

FIG. 10 is a diagram showing an example of the second image after undergoing the scaling process for each scan line (i.e., an example of the second image in the first embodiment) displayed on the second display unit 20 of the image display device 100 according to the first embodiment. FIG. 11 is a diagram showing the virtual image 21b visually recognized by the observer 80 when the second image shown in FIG. 10 (i.e., the second image in the first embodiment) is displayed on the second display unit 20 of the image display device 100 according to the first embodiment. By transforming the map image in FIG. 8 into the second image data A21 like the one shown in FIG. 10 by the processing by the image processing unit 150, the virtual image in the unnaturally distorted shape that appeared as shown in FIG. 9 can be displayed as a virtual image 21b in an appropriate shape as shown in FIG. 11. The observer 80 can appropriately visually recognizes the intersection angle and the intersection position of the real image and the virtual image formed based on the first image displayed on the display region 10a of the first display unit 10 and the second image displayed on the display region 20a of the second display unit 20.

(1-3) Effect

As described above, with the image display device 100 according to the first embodiment, even when the position of the viewpoint 81 of the observer 80 changes, the observer 80 can appropriately feel the stereognostic sense in the real image based on the first image displayed on the first display unit 10 and the virtual image based on the second image displayed on the second display unit 20.

Further, since the panel 30 in the first embodiment is in a concave surface shape as viewed from the observer 80, the second display unit 20 can be downsized, and consequently, the image display device 100 can be downsized.

Furthermore, in conventional image display devices, the visual stereognostic sense felt by the observer 80 is dependent exclusively on a positional relationship among the first display unit 10, the second display unit 20 and the panel 30 as the half mirror, and is constant irrespective of the contents of the displayed image. In contrast, with the image display device 100 according to the first embodiment, the stereognostic representation can be varied and the variety of the stereognostic representation can be increased.

(2) Second Embodiment

Figure 12:
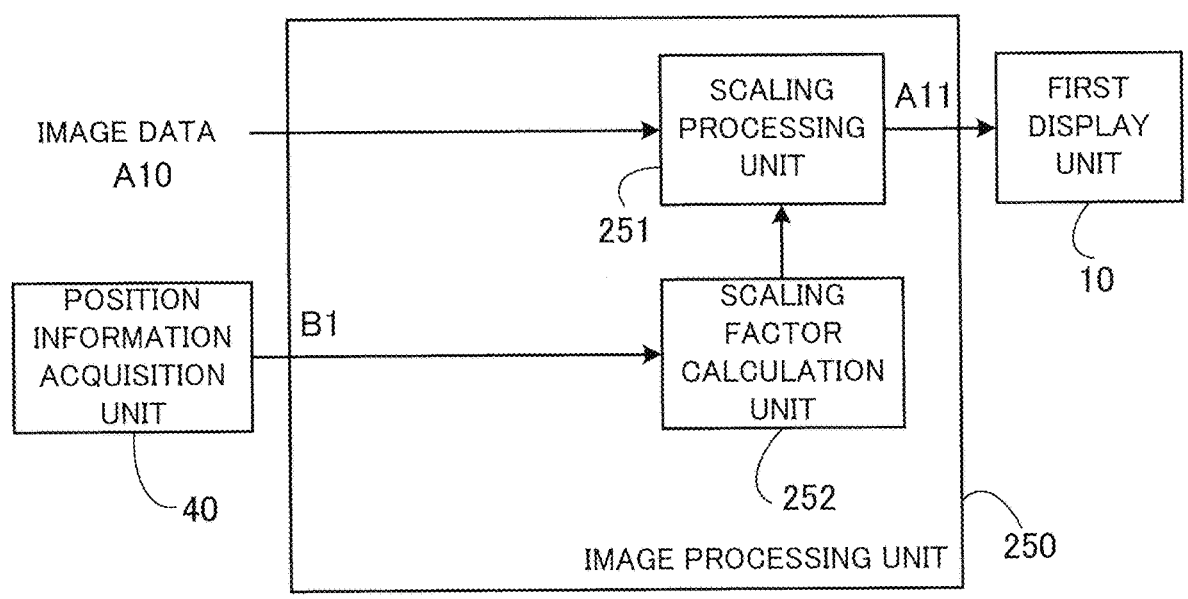
FIG. 12 is a block diagram showing components of a principal part of an image processing unit of an image display device according to a second embodiment of the present invention.

FIG. 12 is a block diagram showing components of a principal part of an image processing unit 250 of an image display device 200 according to a second embodiment of the present invention. As shown in FIG. 12, the image processing unit 250 includes a scaling processing unit 251 capable of performing the scaling process, i.e., the magnifying or reducing process, on the inputted image data A10 and a scaling factor calculation unit 252 that determines the scaling factor, i.e., the magnification ratio or the reduction ratio, used for the scaling process. The image processing unit 250 receives the image data A10 representing the first image to be displayed by the first display unit 10 and the position information B1 on the viewpoint 81 obtained from the position information acquisition unit 40 for acquiring the position of the viewpoint 81 of the observer 80, and provides the first display unit 10 with the first image data A11 after undergoing the scaling process. The scaling factor calculation unit 252 of the image processing unit 250 calculates the scaling factor based on the position information on the viewpoint 81. The scaling processing unit 251 receives the scaling factor determined by the scaling factor calculation unit 252, performs the scaling process on the inputted image data A10, and outputs the first image data A11 after undergoing the scaling process. The image display device 200 according to the second embodiment performs the scaling process by the image processing unit 250 on the image data A10 to be inputted to the first display unit 10 for displaying the real image and thereby maintains the intersection angle formed by the intersecting real image surface 11 and virtual image surface 21 at a constant angle even when the position of the viewpoint 81 changes.

Although it is not shown in FIG. 12, the image processing unit 250 of the image display device 200 according to the second embodiment also has the configuration of the image processing unit 150 in the first embodiment. Therefore, the image display device 200 according to the second embodiment is capable of performing the scaling process for each scan line on the image data A20 in the same way as the image display device 100 according to the first embodiment.

Since the real image surface 11 formed by the first display unit 10 is a flat surface, it is unnecessary in the scaling process of the first image performed by the image processing unit 250 to calculate the scaling factor for each scan line as in the scaling process of the second image. However, the scaling factor used for the scaling process of the first image can also be calculated for each scan line similarly to the scaling factor in the scaling process of the second image.

Figure 13:
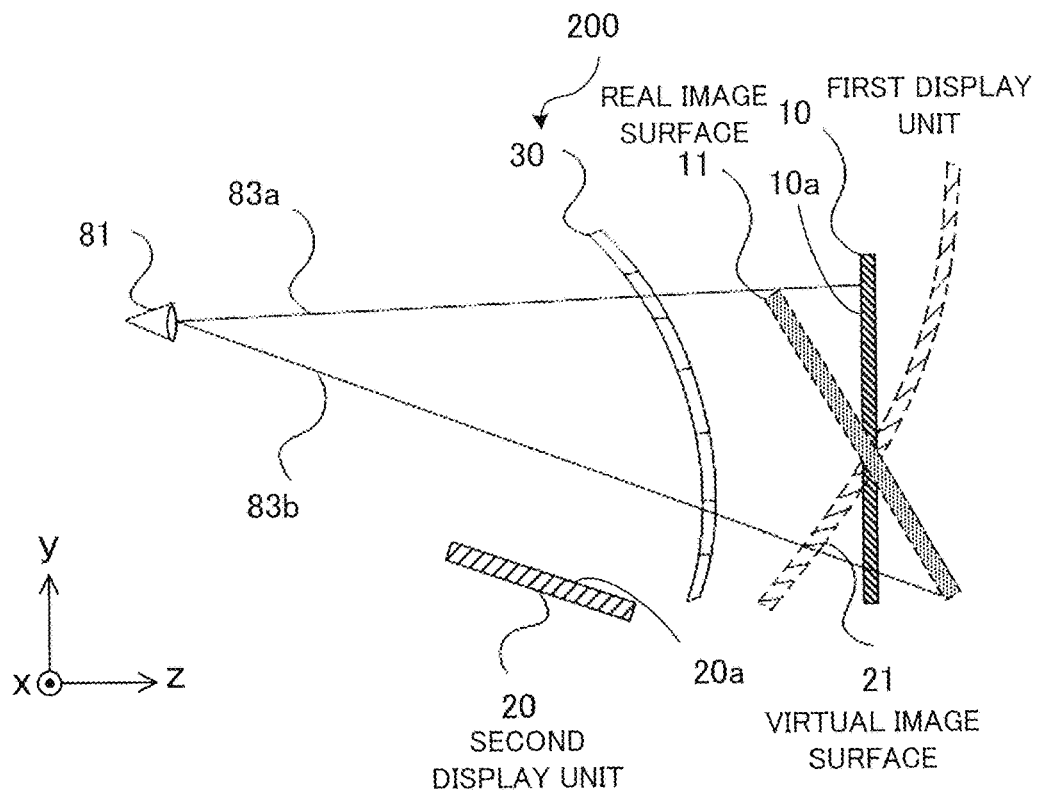
FIG. 13 is a vertical sectional view showing an example of a calculation method of the scaling factor (namely, an example of a case where a viewpoint is at a high position) in an image processing unit of the image display device according to the second embodiment.
Figure 14:
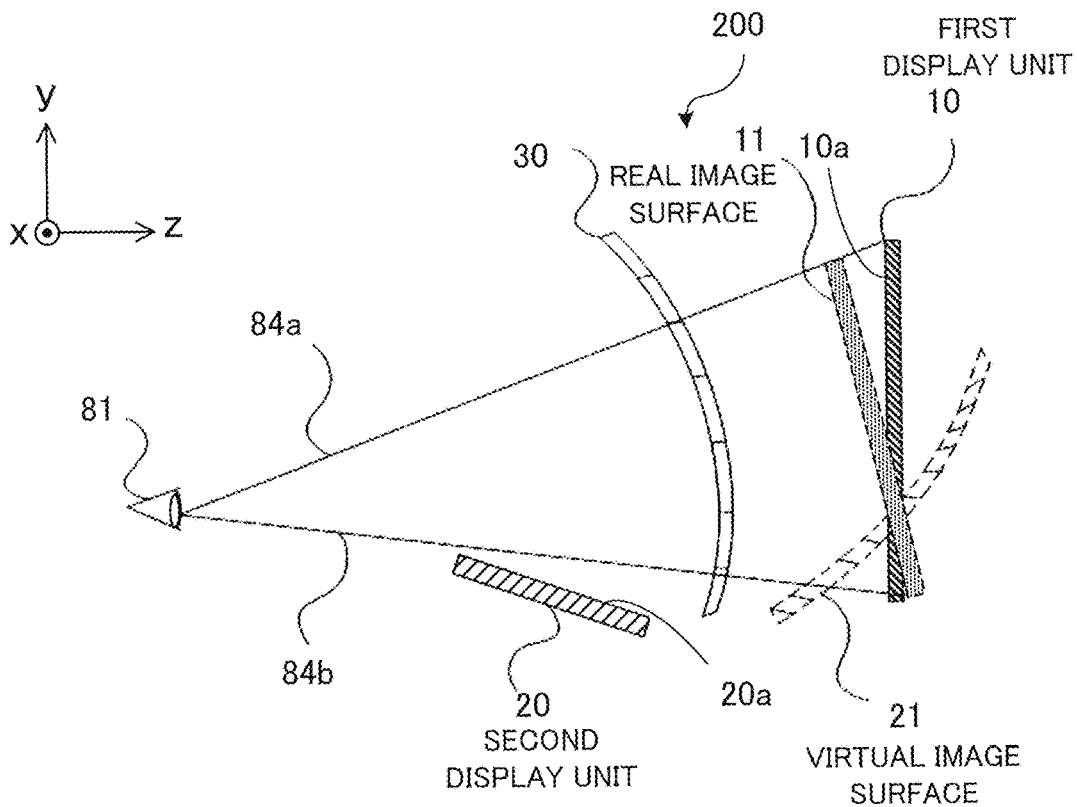
FIG. 14 is a vertical sectional view showing an example of the calculation method of the scaling factor (namely, an example of a case where the viewpoint is at a low position) in the image processing unit of the image display device according to the second embodiment.

FIG. 13 is a vertical sectional view showing an example of a calculation method of the scaling factor (namely, an example of a case where the viewpoint 81 is at a high position) in the image processing unit 250 of the image display device 200 according to the second embodiment. FIG. 14 is a vertical sectional view showing an example of the calculation method of the scaling factor (namely, an example of a case where the viewpoint is at a low position) in the image processing unit 250 of the image display device 200 according to the second embodiment.

The image processing unit 250 generates the first image data A11 by processing the image data A10 so that the intersection angle between the real image surface 11 and the virtual image surface 21 is maintained at a desired angle. For example, if the inclination of the real image surface 11 is changed, the observer 80 does not visually recognize the image in a region in FIG. 13 outside (namely, above) the straight line 83a connecting the viewpoint 81 and the upper end of the real image surface 11 and a region outside (namely, below) the straight line 83b connecting the viewpoint 81 and the lower end of the real image surface 11 that are included in the display region 10a of the first display unit 10. Similarly, if the inclination of the real image surface 11 is changed, the observer 80 does not visually recognize the image in a region in FIG. 14 outside (namely, above) the straight line 84a connecting the viewpoint 81 and the upper end of the real image surface 11 and a region outside (namely, below) the straight line 84b connecting the viewpoint 81 and the lower end of the real image surface 11 that are included in the display region 10a of the first display unit 10.

Further, in the second embodiment, since the first display unit 10 has a flat surface, the desired real image surface 11 is also formed as a flat surface, and accordingly, the three-dimensional distance between a position on the real image surface 11 as viewed from the observer 80 and a corresponding position on the first display unit 10 changes linearly in regard to each of the vertical direction (y direction) and the horizontal direction (x direction). Thus, in the calculation of the scaling factors in the vertical direction (y direction) and the horizontal direction (x direction) by the scaling factor calculation unit 252, the calculation of the scaling factor for each scan line is not necessarily required. In the calculation of the scaling factors in the vertical direction and the horizontal direction by the scaling factor calculation unit 252, it is possible to calculate a scaling factor in the direction of the sight line 82 and calculate the scaling factor for pixels between the straight lines 83a and 83b (or pixels between the straight lines 84a and 84b) based on the scaling factor in the direction of the sight line 82 by using the linear change.

Figure 15:
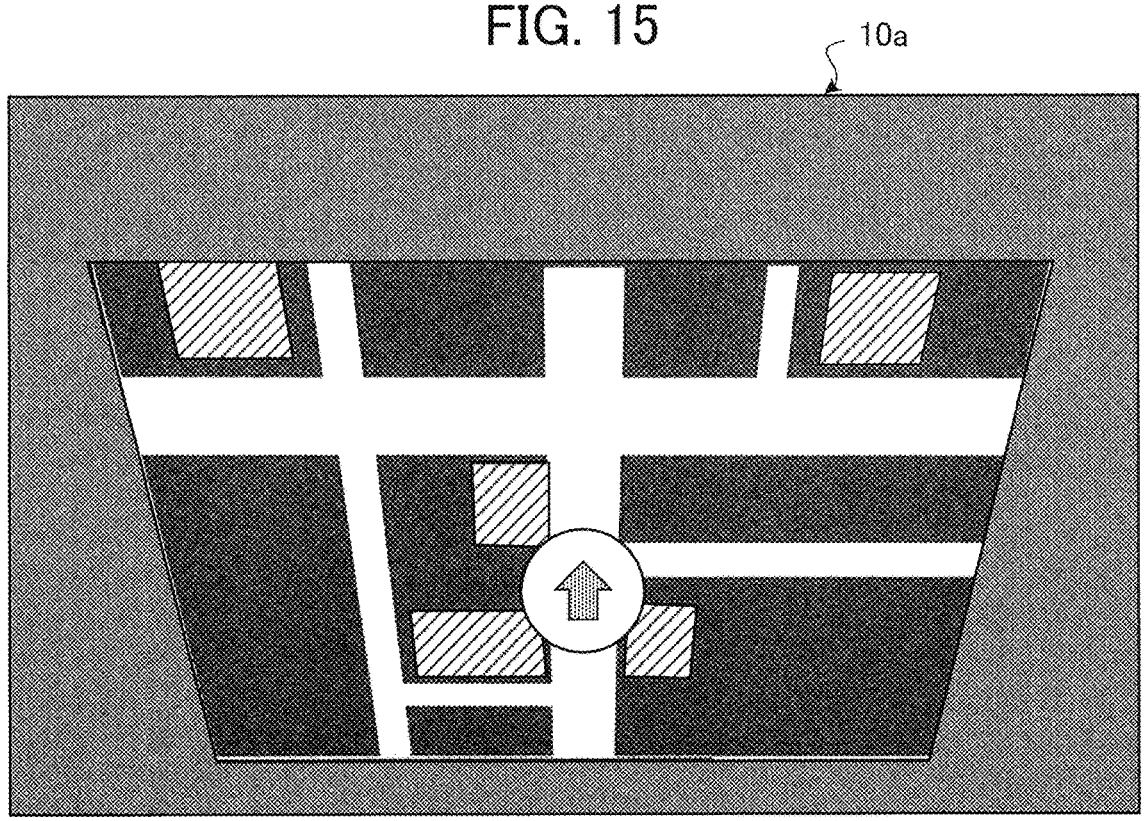
FIG. 15 is a diagram showing an example of the first image after undergoing the scaling process (namely, example of the case of FIG. 13) displayed on a first display unit of the image display device according to the second embodiment.
Figure 16:
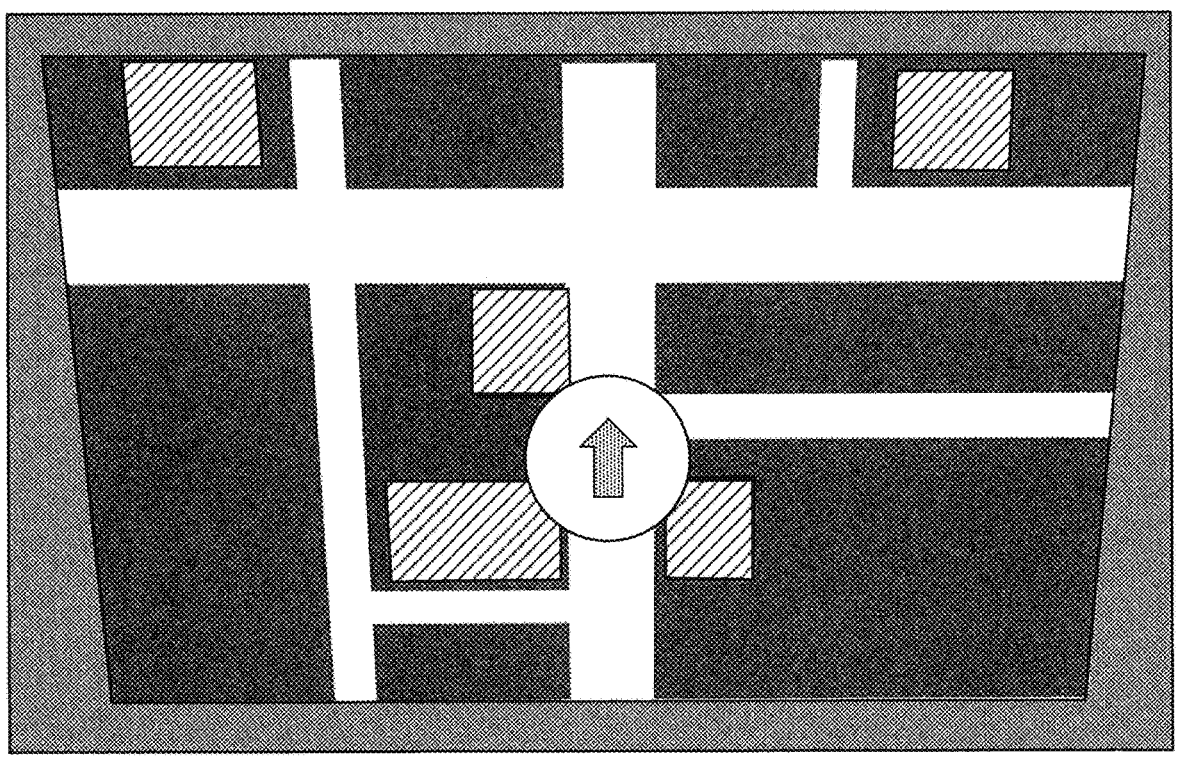
FIG. 16 is a diagram showing an example of the first image after undergoing the scaling process (namely, example of the case of FIG. 14) displayed on the first display unit of the image display device according to the second embodiment.

FIG. 15 is a diagram showing an example of the first image after undergoing the scaling process (namely, example of the case of FIG. 13) displayed on the display region 10a of the first display unit 10 of the image display device 200 according to the second embodiment. FIG. 16 is a diagram showing an example of the first image after undergoing the scaling process (namely, example of the case of FIG. 14) displayed on the display region 10a of the first display unit 10 of the image display device 200 according to the second embodiment. By changing a projection angle of the display region and the scaling factor based on the position of the viewpoint 81 of the observer 80, representation at a fixed angle of intersection with the virtual image surface 21 becomes possible.

As described above, with the image display device 200 according to the second embodiment, even when the position of the viewpoint 81 of the observer 80 changes, the observer 80 can appropriately feel the stereognostic sense in the real image based on the first image displayed on the first display unit 10 and the virtual image based on the second image displayed on the second display unit 20.

Except for the above-described features, the image display device 200 according to the second embodiment is the same as the image display device 100 according to the first embodiment.

(3) Third Embodiment

Figure 17:
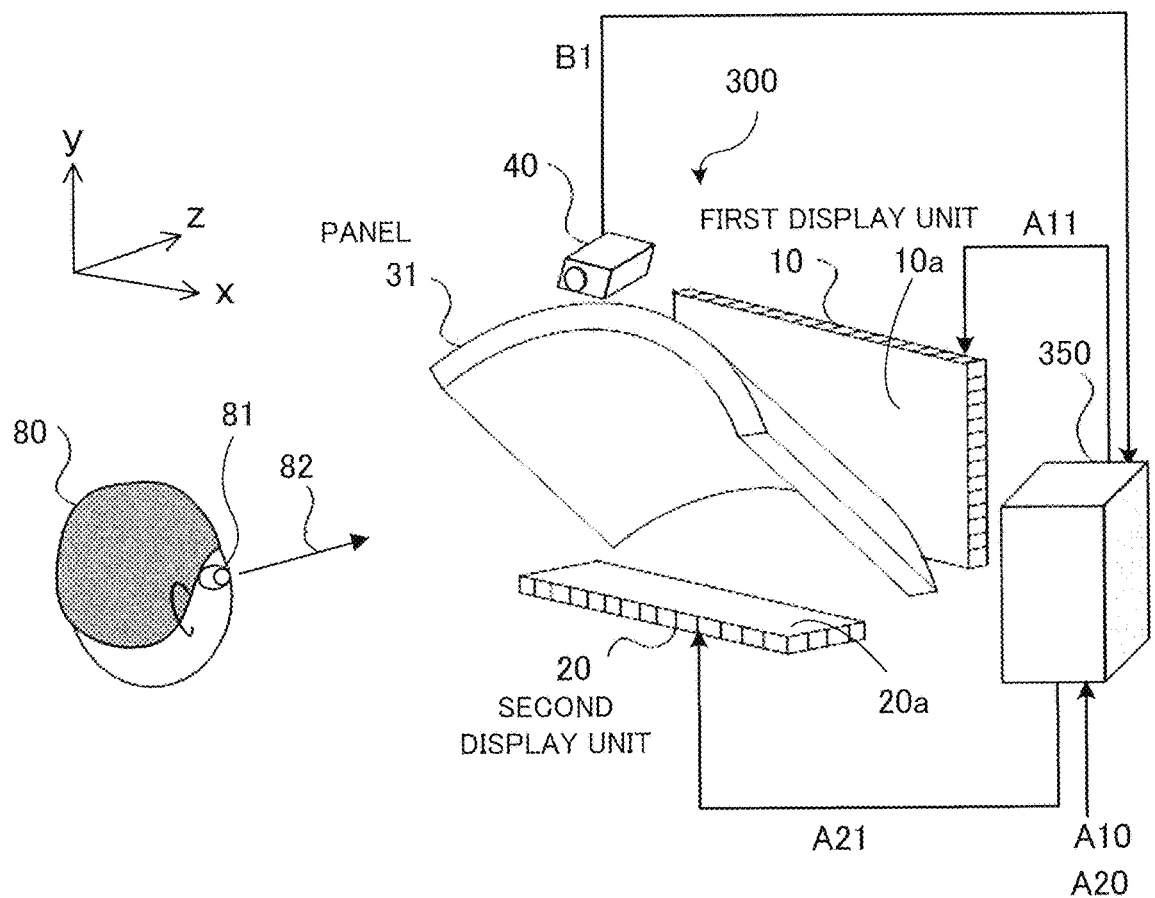
FIG. 17 is a diagram schematically showing the configuration of an image display device according to a third embodiment of the present invention.

FIG. 17 is a diagram schematically showing the configuration of an image display device 300 according to a third embodiment of the present invention. FIG. 17 shows the structure of an optical system of the image display device 300 as viewed from obliquely above, the observer 80 viewing an image in the direction of the sight line 82, and an image processing unit 350. In FIG. 17, each component identical or corresponding to a component shown in FIG. 1 is assigned the same reference character as in FIG. 1.

As shown in FIG. 17, the image display device 300 according to the third embodiment includes the first display unit 10 having the display region 10a for displaying an image, the second display unit 20 having the display region 20a for displaying an image, a panel 31 that is a light transmissive reflective panel, the position information acquisition unit 40 that acquires the position information on the viewpoint 81 as the position of the eyes of the observer 80, and the image processing unit 350 that provides the first display unit 10 and the second display unit 20 with image data. The image display device 300 according to the third embodiment differs from the image display device 100 according to the first embodiment in the shape of the panel 31.

In the example of FIG. 17, the panel 31 is in a concave surface shape as viewed from the viewpoint 81 of the observer 80. The panel 31 has a concave surface shape that is curved in a transverse direction. In the example of FIG. 17, a cross section of the panel 31 slicing the panel 31 at a substantially horizontal plane including the sight line 82 heading from the viewpoint 81 towards the panel 31, that is, a plane substantially parallel to the xz plane, is in an arc-like shape. Further, a cross section of the panel 31 slicing the panel 31 at a substantially vertical plane including the sight line 82, that is, a plane parallel to the yz plane, is in a straight shape. Since the virtual image surface 21 expands in the transverse direction thanks to the configuration in the third embodiment, downsizing of the second display unit 20 becomes possible, and consequently, downsizing of the image display device 300 is possible.

Figure 18:
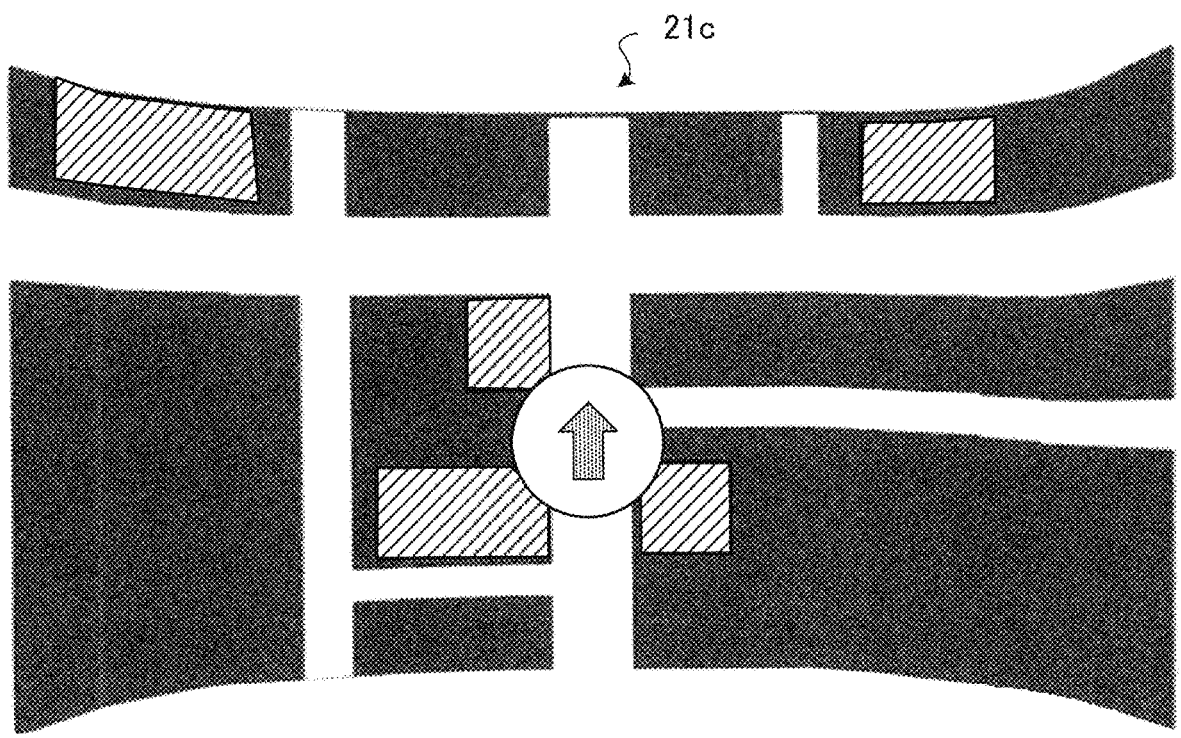
FIG. 18 is a diagram showing a virtual image visually recognized by the observer when the second image shown in FIG. 8 (i.e., the second image as the comparative example) is displayed on the second display unit of the image display device according to the third embodiment.

FIG. 18 is a diagram showing a virtual image 21c visually recognized by the observer 80 when the second image shown in FIG. 8 (i.e., the second image as the comparative example) is displayed on the second display unit 20 of the image display device 300 according to the third embodiment. By the panel 31, the virtual image surface is enlarged in both of leftward and rightward directions, and the virtual image 21c is magnified in the vertical direction more greatly with the decrease in the distance from the left end or with the decrease in the distance from the right end.

Further, the magnification ratio of the virtual image 21c changes depending on the position of the viewpoint 81 of the observer 80, and when the viewpoint 81 is situated on a right-hand side with respect to the center of the image display device 300, the magnification ratio of a right-hand part of the virtual image 21c decreases and the magnification ratio of a left-hand part of the virtual image 21c increases. Conversely, when the viewpoint 81 is situated on a left-hand side with respect to the center of the image display device 300, the magnification ratio of the left-hand part of the virtual image 21c decreases and the magnification ratio of the right-hand part of the virtual image 21c increases.

Figure 19:
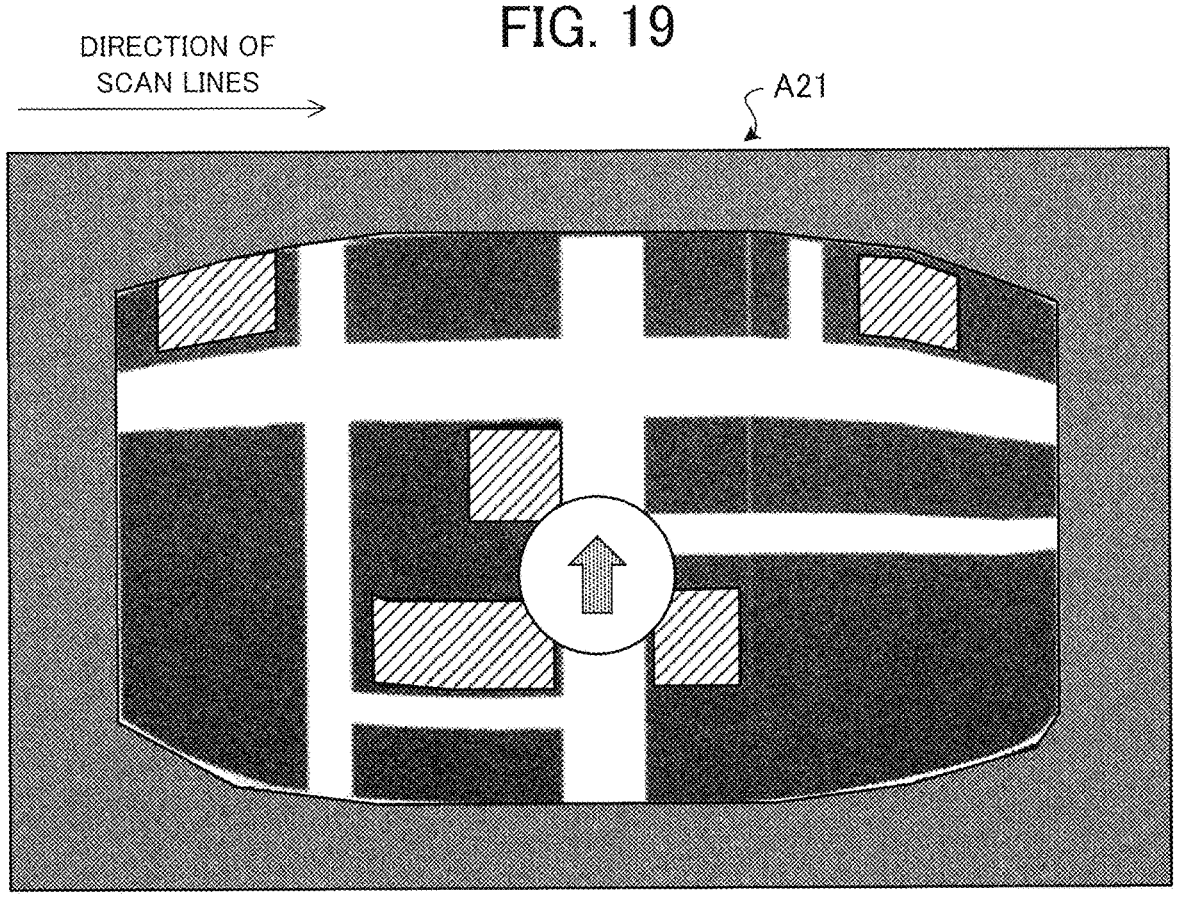
FIG. 19 is a diagram showing an example of the second image after undergoing the scaling process for each scan line (i.e., an example of the second image in the third embodiment) displayed on the second display unit of the image display device according to the third embodiment.

FIG. 19 is a diagram showing an example of the second image after undergoing the scaling process for each scan line (i.e., an example of an image based on the second image data A21 in the third embodiment) displayed on the second display unit 20 of the image display device 300 according to the third embodiment. Incidentally, the purpose of the processing by the image processing unit 350 in the third embodiment is the same as the purpose of the processing by the image processing unit 150 in the first embodiment, and the desired virtual image recognized by the observer 80 is the same as the virtual image 21b shown in FIG. 11. Thus, in the third embodiment, by displaying an image after undergoing the reduction process in the vertical direction and the scaling process for each scan line like the one showing in FIG. 19 on the display region 20a of the second display unit 20, an image capable of letting the observer 80 feel an appropriate stereognostic sense like the virtual image 21b shown in FIG. 11 can be presented to the observer 80.

As described above, with the image display device 300 according to the third embodiment, even when the position of the viewpoint 81 of the observer 80 changes, the observer 80 can appropriately feel the stereognostic sense in the real image based on the first image displayed on the first display unit 10 and the virtual image based on the second image displayed on the second display unit 20.

Except for the above-described features, the image display device 300 according to the third embodiment is the same as the image display device 100 according to the first embodiment.

(4) Fourth Embodiment

Figure 20:
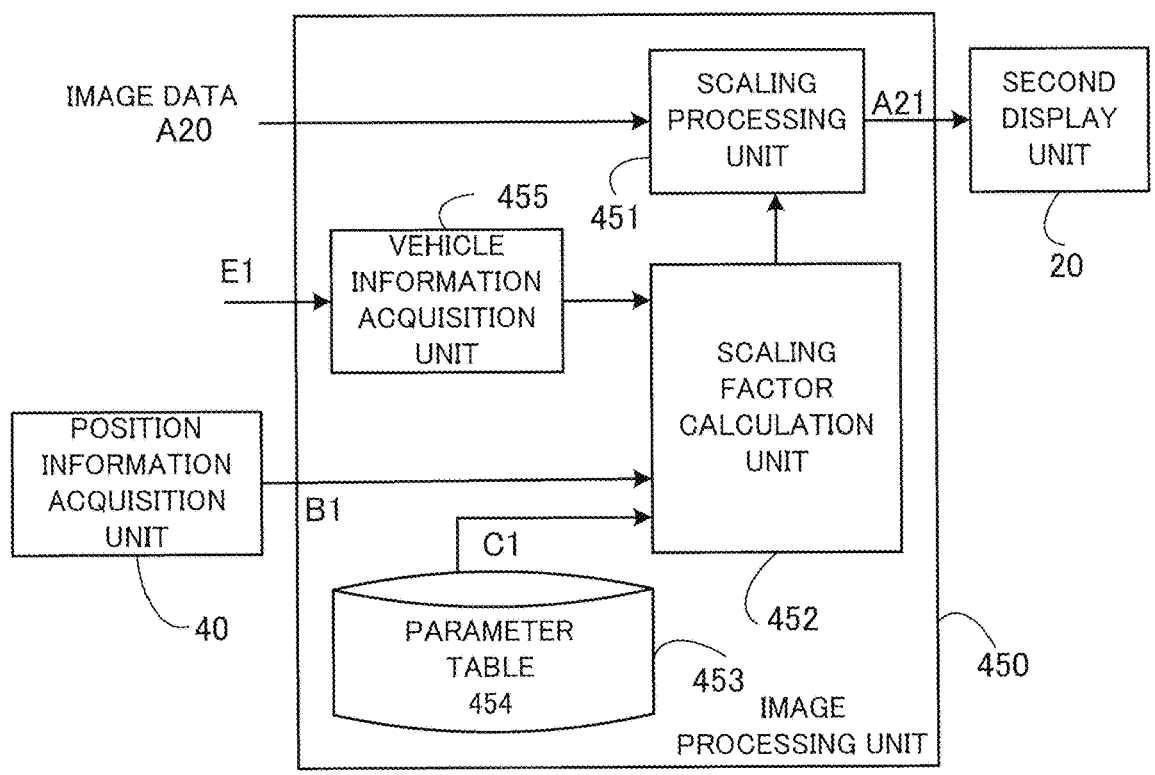
FIG. 20 is a block diagram showing components of a principal part of an image processing unit of an image display device according to a fourth embodiment of the present invention.

FIG. 20 is a block diagram showing components of a principal part of an image processing unit 450 of an image display device according to a fourth embodiment of the present invention. The image display device according to the fourth embodiment is mounted on the instrument panel of a vehicle (e.g., automobile) and switches its image display method based on vehicle information E1 indicating traveling condition of the vehicle. The image display device according to the fourth embodiment differs from the image display device 100 according to the first embodiment in that the image processing unit 450 performs a process based on the vehicle information E1 indicating the traveling condition of the vehicle. Incidentally, while a configuration for performing the scaling process of the image data A20 based on the vehicle information E1 is shown in FIG. 20, it is also possible to perform the scaling process of the image data A10 instead of the scaling process of the image data A20 or in addition to the scaling process of the image data A20.

As shown in FIG. 20, the image processing unit 450 includes a scaling processing unit 451 capable of performing the scaling process for each scan line, i.e., the magnifying or reducing process for each scan line, on the inputted image data A20, a scaling factor calculation unit 452 that determines the scaling factor, i.e., the magnification ratio or the reduction ratio, used for the scaling process, and a storage unit 453 that stores reference information to be used for the determination of the scaling factor as a parameter table 454. The image processing unit 450 receives second image data representing the second image to be displayed by the second display unit 20, the position information on the viewpoint 81 obtained from the position information acquisition unit 40 for acquiring the position of the viewpoint 81 of the observer 80, and the vehicle information E1 (e.g., traveling speed information) supplied from a vehicle information acquisition unit 455 for acquiring the vehicle information E1 indicating the condition of the vehicle equipped with the image display device, and provides the second display unit 20 with the second image data A21 after undergoing the scaling process for each scan line. The scaling factor calculation unit 452 of the image processing unit 450 calculates the scaling factor for each scan line based on the position information on the viewpoint 81, the information in the parameter table 454 stored in the storage unit 453, and the vehicle information E1. For each scan line means, for example, for each horizontal scan line including a plurality of pixels. For each scan line can also be used in the meaning of for each vertical scan line including a plurality of pixels. The scaling processing unit 451 receives the scaling factor for each scan line determined by the scaling factor calculation unit 452, performs the scaling process on the inputted image data A20, and outputs the second image data A21 after undergoing the scaling process for each scan line.

In navigation guidance display in the vehicle, for example, the image processing unit 450 uses navigation information and the parameters in conjunction with each other so that the intersection position of the two display images and the position of the direction indication coincide with each other.

Figure 21:
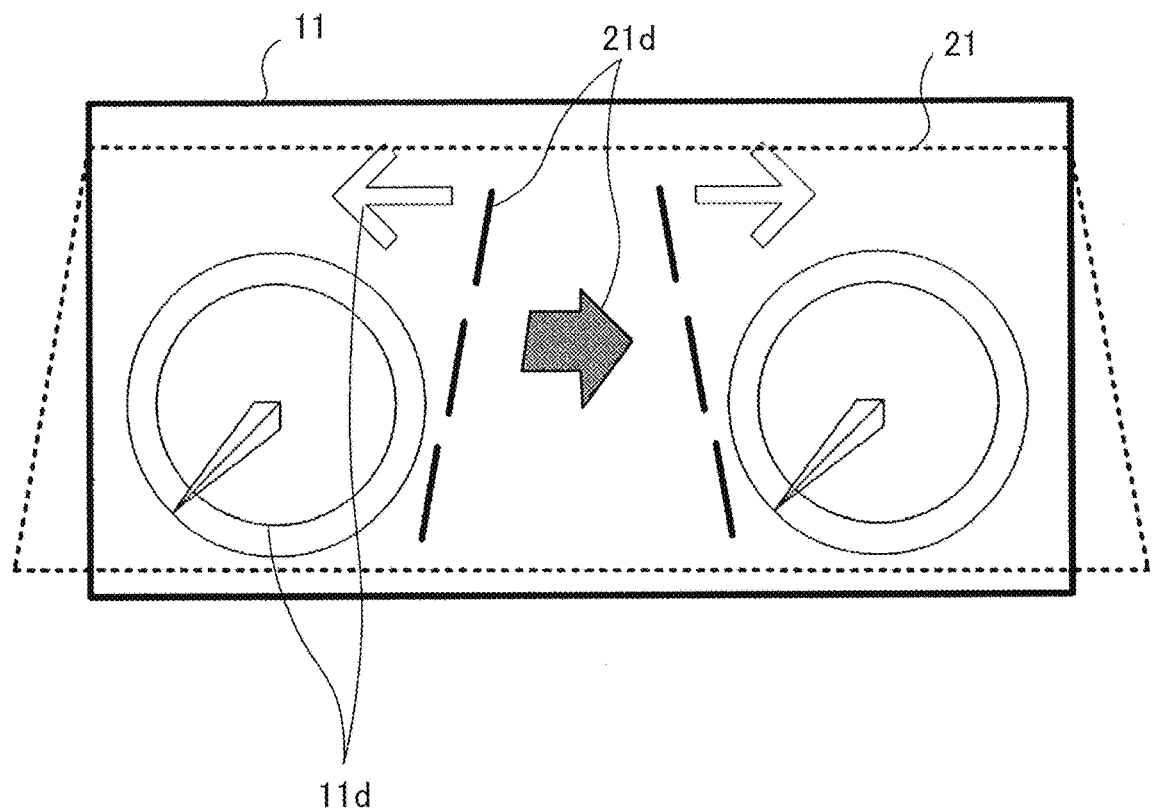
FIG. 21 is a diagram showing an example of the real image and the virtual image viewed by the observer (namely, an example of a case where traveling speed of a vehicle is low) in the image display device according to the fourth embodiment.
Figure 22:
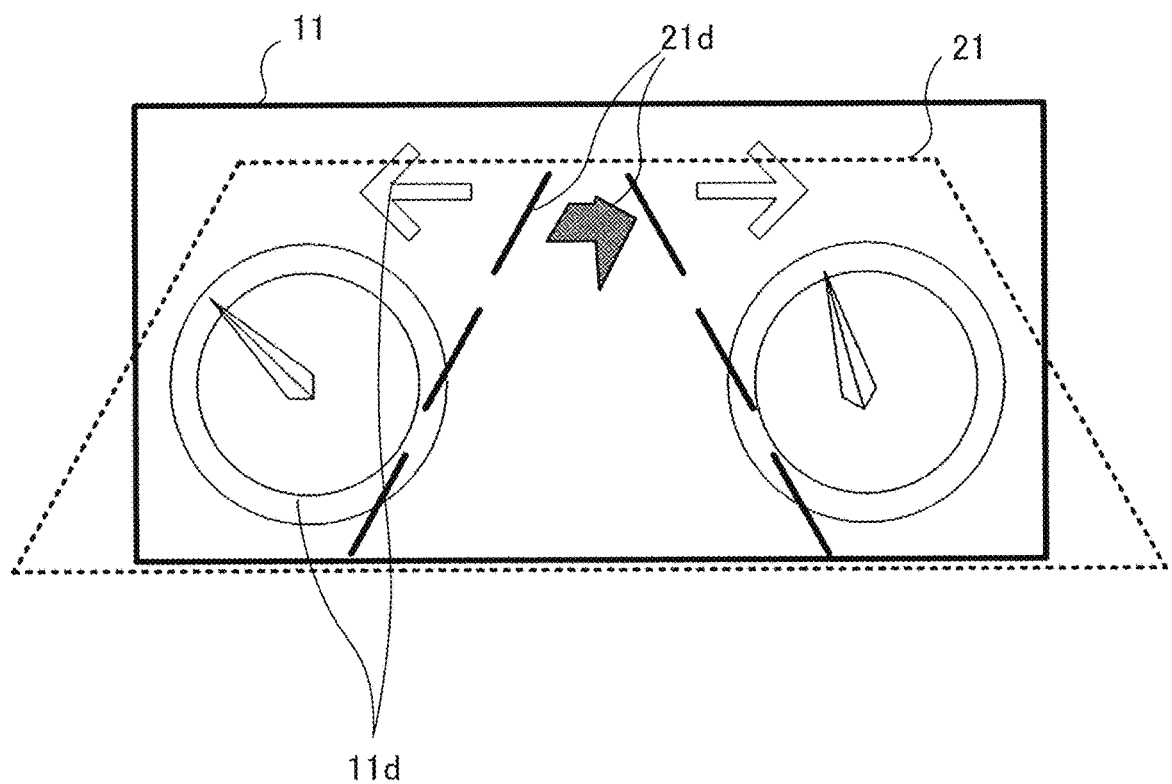
FIG. 22 is a diagram showing an example of the real image and the virtual image viewed by the observer (namely, an example of a case where the traveling speed of the vehicle is high) in the image display device according to the fourth embodiment.

FIG. 21 is a diagram showing an example of the real image and the virtual image viewed by the observer 80 (namely, an example of a case where the traveling speed of the vehicle is low) in the image display device according to the fourth embodiment. FIG. 22 is a diagram showing an example of the real image and the virtual image viewed by the observer 80 (namely, an example of a case where the traveling speed of the vehicle is high) in the image display device according to the fourth embodiment. Instrument display 11d such as direction lighting display and a speed meter is displayed by the first display unit 10 so as to look vertical from the observer 80. Navigation display such as an arrow and a road indication 21d such as map information are displayed by the image processing unit 450 to be the desired virtual image surface 21.

As shown in FIG. 21, when the traveling speed of the vehicle is low, the sense of depth when viewing the navigation display and the road indication 21d is reduced by reducing the angle formed by the real image surface 11 displaying the real image displayed by the first display unit 10 and the virtual image surface 21 displaying the virtual image. With this sense of depth, a positional relationship between the position of the vehicle and the actual road can be perceived in the navigation display and the road indication 21d at the time of low speed traveling.

As shown in FIG. 22, when the traveling speed of the vehicle is high, the sense of depth when viewing the navigation display and the road indication 21d is increased by increasing the angle formed by the real image surface 11 displaying the real image displayed by the first display unit 10 and the virtual image surface 21 displaying the virtual image. With the sense of depth, the positional relationship between the position of the vehicle and the actual road can be perceived in the navigation display and the road indication 21d at the time of high speed traveling. The driver as the observer 80 can recognize that the vehicle is traveling at high speed based on the inclination of the virtual image, receive an instruction by the navigation display at a stage when the distance to a target position (e.g., a crossing or the like) is long, and make an adjustment of the driving (e.g., the lane change, deceleration or the like) at an early stage.

As described above, with the image display device according to the fourth embodiment, even when the position of the viewpoint 81 of the observer 80 changes, the observer 80 can appropriately feel the stereognostic sense in the real image based on the first image displayed on the first display unit 10 and the virtual image based on the second image displayed on the second display unit 20.

Except for the above-described features, the image display device according to the fourth embodiment is the same as the image display device 100 according to the first embodiment.

(5) Modification

Figure 23:
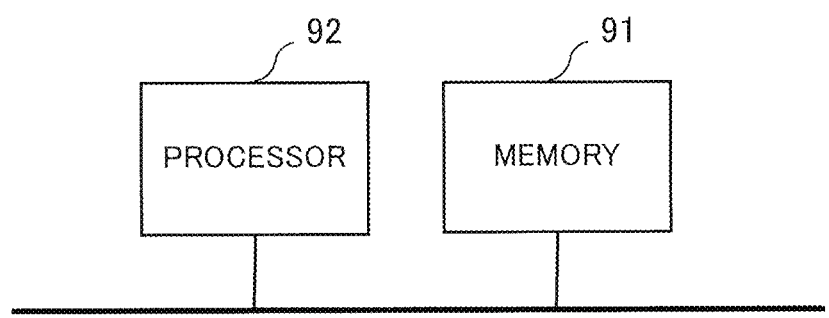
FIG. 23 is a diagram showing an example of the hardware configuration of an image processing unit of an image display device according to a modification of the first to fourth embodiments.

FIG. 23 is a diagram schematically showing the hardware configuration of an image processing unit of an image display device according to a modification of the above-described first to fourth embodiments. While the image processing unit 150, 250, 350, 450 shown in FIG. 3, FIG. 12, FIG. 17 or FIG. 20 can be formed with an integrated circuit, the image processing unit 150, 250, 350, 450 may also be implemented by using a memory 91 as a storage device storing a program as software and a processor 92 as an information processing unit executing the program stored in the memory 91 (e.g., by a computer). It is also possible to implement part of the image processing unit 150, 250, 350, 450 with the memory 91 shown in FIG. 23 and the processor 92 executing a program.

Further, it is also possible to form the panel 30 or 31 as a panel in a concave surface shape of a hemispherical shape. In this case, by arranging the second display unit 20 over, under, to the left of or to the right of the panel 30 or 31, a virtual image at a larger scaling factor is displayed with the increase in the distance from a central position of the hemispherical shape.

Furthermore, it is possible to appropriately combine components of the image display devices according to the above-described first to fourth embodiments with each other.

DESCRIPTION OF REFERENCE CHARACTERS

10: first display unit, 10a: display region, 11: real image surface, 20: second display unit, 20a: display region, 21: virtual image surface, 21a: virtual image, 30, 31: panel, 40: position information acquisition unit, 80: observer, 81: viewpoint, 82: sight line, 100, 200, 300: image display device, 150, 250, 350, 450: image processing unit, A10: image data, A11: first image data, A20: image data, A21: second image data, B1: position information.

What is claimed is:
1. An image display device comprising:
a panel in a curved surface shape to let through and reflect incident light;
a first display device to display a first image that reaches a predetermined position through the panel, the first image being based on first image data;
a second display device to display a second image that is reflected by the panel and reach the predetermined position, the second image being based on second image data; and
processing circuitry
to acquire position information indicating a position of an actual viewpoint of an observer observing the first image and the second image,
to determine a scaling factor of the second image data for each scan line based on the position information, and to perform a scaling process for each scan line on the second image data to be inputted to the second display device by using the scaling factor.

2. The image display device according to claim 1, wherein the panel is in a concave surface shape as viewed from the viewpoint.

3. The image display device according to claim 2, wherein a cross section of the panel slicing the panel at a horizontal plane including a line of sight heading from the viewpoint towards the panel is in a straight shape, and a cross section of the panel slicing the panel at a vertical plane including the line of sight is in an arc-like shape.

4. The image display device according to claim 3, wherein the scaling process for each scan line is a scaling process in a horizontal scan line direction.

5. The image display device according to claim 2, wherein a cross section of the panel slicing the panel at a horizontal plane including a line of sight heading from the viewpoint towards the panel is in an arc-like shape, and a cross section of the panel slicing the panel at a vertical plane including the line of sight is in a straight shape.

6. The image display device according to claim 5, wherein the scaling process for each scan line is a scaling process in a vertical scan line direction.

7. The image display device according to claim 1, wherein the processing circuitry performs a process of scaling the first image based on the first image data.

8. The image display device according to claim 1, wherein the processing circuitry performs the scaling process for each scan line so that a real image surface recognized by the observer as a place where a real image corresponding to the first image exists and a virtual image surface recognized by the observer as a place where a virtual image corresponding to the second image exists intersect with each other.

9. The image display device according to laim 1, wherein the processing circuitry performs the scaling process for each scan line so that a real image surface recognized by the observer as a place where a real image corresponding to the first image exists and a virtual image surface recognized by the observer as a place where a virtual image corresponding to the second image exists intersect with each other and an angle formed by the real image surface and the virtual image surface is maintained at a constant angle.

10. The image display device according to claim 8, wherein:
   the processing circuitry previously stores reference information indicating a relationship between the position information and the virtual image surface as a database and
   the processing circuitry calculates the scaling factor for each scan line based on the position information and the reference information in the database.

11. The image display device according to claim 8, wherein
   the processing circuitry acquires vehicle information indicating condition of a vehicle equipped with the image display device, and
   the processing circuitry calculates the scaling factor for each scan line based on the vehicle information.

\* \* \* \* \*